US011598444B2

(12) United States Patent
Collins et al.

(10) Patent No.: US 11,598,444 B2
(45) Date of Patent: Mar. 7, 2023

(54) DEVICE FOR CONTROLLING FLUID FLOW

(71) Applicant: OFIP LIMITED, Oxford (GB)

(72) Inventors: Matthew Collins, Oxford (GB); Christopher Kennell, Oxford (GB)

(73) Assignee: OFIP LIMITED, Oxford (GB)

( * ) Notice: Subject to any disclaimer, the term of this patent is extended or adjusted under 35 U.S.C. 154(b) by 0 days.

(21) Appl. No.: 17/258,686

(22) PCT Filed: Mar. 24, 2020

(86) PCT No.: PCT/GB2020/050784
§ 371 (c)(1),
(2) Date: Jan. 7, 2021

(87) PCT Pub. No.: WO2020/193968
PCT Pub. Date: Oct. 1, 2020

(65) Prior Publication Data
US 2021/0270386 A1  Sep. 2, 2021

(30) Foreign Application Priority Data

Mar. 27, 2019 (GB) ....................... 1904254
Jun. 7, 2019 (GB) ....................... 1908174

(51) Int. Cl.
*F16K 31/122* (2006.01)
*F16K 3/26* (2006.01)
(Continued)

(52) U.S. Cl.
CPC .......... *F16K 31/1221* (2013.01); *F16K 3/265* (2013.01); *F16K 27/041* (2013.01);
(Continued)

(58) Field of Classification Search
CPC ............... F16K 1/126; Y10T 137/3367; Y10T 137/3421
(Continued)

(56) References Cited

U.S. PATENT DOCUMENTS 1,321,751 A * 11/1919 Johnson .................. F16K 1/126
137/219
1,483,991 A * 2/1924 Slattery .................. F16K 1/126
137/219
(Continued)

FOREIGN PATENT DOCUMENTS

CN 108006313 A 5/2018
DE 3740708 A1 6/1989
(Continued)

OTHER PUBLICATIONS

Examination Report for European Patent Application No. 20716881.6, dated Aug. 25, 2021, 8 pages.
(Continued)

*Primary Examiner* — Robert K Arundale
(74) *Attorney, Agent, or Firm* — Withrow & Terranova, P.L.L.C.; Vincent K. Gustafson

(57) ABSTRACT

A device for controlling the flow of a fluid through a conduit from an upstream side of the device to a downstream side of the device is provided. The device includes an upstream valve casing defining an inlet, a downstream valve casing defining an outlet aperture, and a valve core secured between the upstream valve casing and the downstream valve casing. The upstream valve casing, the downstream valve casing and the valve core are formed as discrete parts. The valve core includes a housing defining a control volume. The valve member is mounted on the housing and positioned on the upstream side of the outlet aperture, the valve member being arranged to move reciprocally to selectively open and close the outlet aperture, thereby controlling flow of the fluid through the outlet aperture.

19 Claims, 11 Drawing Sheets

(51) Int. Cl.
  *F16K 27/04* (2006.01)
  *F16K 31/124* (2006.01)
  *F16K 37/00* (2006.01)
  *G05D 16/16* (2006.01)
  *F16K 1/12* (2006.01)

(52) U.S. Cl.
  CPC ........ *F16K 31/124* (2013.01); *F16K 37/0033* (2013.01); *F16K 37/0041* (2013.01); *G05D 16/166* (2013.01); *F16K 1/126* (2013.01); *Y10T 137/3367* (2015.04); *Y10T 137/8242* (2015.04)

(58) Field of Classification Search
  USPC .................................................. 251/31, 63.5
  See application file for complete search history.

(56) References Cited

U.S. PATENT DOCUMENTS

| | | | | |
|---|---|---|---|---|
| 1,727,517 | A * | 9/1929 | Lewis | F16K 1/126 137/219 |
| 1,752,439 | A * | 4/1930 | Larner | F16K 1/126 137/219 |
| 1,824,916 | A * | 9/1931 | Moody | F16K 1/126 137/219 |
| 2,919,714 | A * | 1/1960 | Mrazek | G05D 16/2095 137/220 |
| 3,429,331 | A | 2/1969 | Prevost | |
| 4,285,495 | A * | 8/1981 | King | F16K 1/126 137/219 |
| 4,809,742 | A | 3/1989 | Grau | |
| 5,228,469 | A | 7/1993 | Otten et al. | |
| 5,971,353 | A | 10/1999 | Johnson | |
| 6,152,172 | A | 11/2000 | Christianson et al. | |
| 6,220,272 | B1 | 4/2001 | Tavor | |
| 6,670,806 | B2 | 12/2003 | Wendt et al. | |
| 7,190,159 | B2 | 3/2007 | Galbreath et al. | |
| 8,517,333 | B2 | 8/2013 | Briley et al. | |
| 8,931,504 | B2 * | 1/2015 | Canjuga | F16K 1/126 137/220 |
| 9,303,786 | B2 | 4/2016 | Le Moing et al. | |
| 9,915,372 | B2 * | 3/2018 | Esveldt | F16K 1/126 |
| 2004/0216782 | A1 | 11/2004 | Mares et al. | |
| 2008/0092960 | A1 | 4/2008 | Manecke et al. | |
| 2013/0340428 | A1 * | 12/2013 | Graichen | F16K 37/0041 137/554 |
| 2014/0271138 | A1 | 9/2014 | Markyvech et al. | |
| 2015/0323697 | A1 | 11/2015 | Ohmer et al. | |
| 2016/0139608 | A1 * | 5/2016 | Eickhoff | F16K 27/029 137/1 |
| 2018/0245707 | A1 | 8/2018 | Goll et al. | |
| 2018/0313069 | A1 * | 11/2018 | Cipriani | E03C 1/055 |

FOREIGN PATENT DOCUMENTS

| | | |
|---|---|---|
| DE | 102012109094 A1 | 3/2014 |
| DE | 202017002504 U1 | 8/2018 |
| EP | 2960560 A1 | 12/2015 |
| HR | 20100273 A2 | 11/2011 |
| JP | H07317574 A | 12/1995 |
| JP | 2012107929 A | 6/2012 |
| WO | 9427069 A1 | 11/1994 |
| WO | 2010133902 A2 | 11/2010 |
| WO | 2011120338 A1 | 10/2011 |
| WO | 2014014234 A1 | 1/2014 |
| WO | 2019220153 A2 | 11/2019 |

OTHER PUBLICATIONS

Notice of Acceptance for Australian Patent Application No. 2020249779 dated Jul. 30, 2021, 3 pages.
Official Action (Communication pursuant to Article 94(3)) for European Patent Application No. 20716881.6 dated Feb. 12, 2021, 8 pages.
MLX90333 Position Sensor Datasheet, Revision 008, Melexis NV, Sep. 26, 2017, 48 pages.
Examination Report No. 2 for Australian Patent Application No. 2020249779 dated Apr. 16, 2021, 6 pages.
Notification of Transmittal of International Search Report and Written Opinion (Form PCT/ISA/220), International Search Report (Form PCT/ISA/210), and Written Opinion (Form PCT/ISA/237) for International Application No. PCT/GB2020/050784 dated Jun. 18, 2020, 15 pages.
Search Report under Section 17(5) for United Kingdom Patent Application No. GB1908174.4 dated Oct. 21, 2019, 3 pages.
Search Report under Section 17(5) for United Kingdom Patent Application No. GB1904254.8 dated Jul. 8, 2019, 3 pages.
"Cla-Val Model X117C Valve Position Transmitter Installation / Operation / Maintenance" engineering data sheet, Cla-Val, Newport Beach, CA, USA, Jan. 2008, 4 pages.
"Fisher 4200 Electronic Position Transmitters" product bulletin, Fisher Controls International LLC, Aug. 2018, 8 pages.
"Fisher 4320 Wireless Position Monitor" product bulletin, Fisher Controls International LLC, Oct. 2017, 12 pages.
Lathan et al., "Slide-By Sensing for Long-Stroke Applications Using Allegro Angle Sensors" application information, Allegro MicroSystems, LLC, Worcester, MA, USA, 2016, 9 pages.
Notification of Transmittal of International Search Report and Written Opinion (Form PCT/ISA/220), International Search Report (Form PCT/ISA/210), and Written Opinion (Form PCT/ISA/237) for International Application No. PCT/GB2020/051335 dated Jul. 13, 2020, 15 pages.
First Office Action for Chinese Patent Application No. 20208003229.4, dated Feb. 14, 2022, 17 pages.
Examination Report for European Patent Application No. 20716881.6, dated Jun. 29, 2022, 8 pages.
Ziegler et al., "Sensors and Detection Techniques," SouthwestJiaotong University Press, Jan. 2018, pp. 167-172.
Office Action for Canadian Patent Application No. 3103757, dated Sep. 20, 2022, 3 pages.
Second Office Action for Chinese Patent Application No. 20208003229.4, dated Sep. 28, 2022, 21 pages.

* cited by examiner

DEVICE FOR CONTROLLING FLUID FLOW

This application is a 35 U.S.C. § 371 national phase filing of International Application No. PCT/GB2020/050784 filed on Mar. 24, 2020, and further claims priority to United Kingdom Patent Application No. 1908174.4 filed on Jun. 7, 2019, and to United Kingdom Patent Application No. 1904254.8 filed on Mar. 27, 2019, wherein the disclosures of the foregoing applications are hereby incorporated by reference herein in their respective entireties.

The present invention relates to a device for controlling the flow of fluid in a conduit, in particular to a fluid flow device that has a defined failure mode.

In fluid flow systems such as pipes and conduits, e.g. as can be found in many different industrial situations such as the oil and gas industry, there is a need to control the flow of fluid in a fluid flow stream through the conduit. Devices such as fluid flow control valves and pressure regulators may be used to control or regulate the fluid flow or pressure through the conduit. Such devices may deliver a desired flow rate, or an upstream or downstream pressure, and thus may be controllable in a range between a fully open and fully closed position. Alternatively, such devices may simply act as shut-off valves, being moved between a fully open and fully closed position.

The valve member, the moving part in such valves which is controlled to open and close the valve, is typically actuated by an external mechanical actuator via a stem that protrudes through the valve body and is mechanically coupled to the valve member. However, this mechanical coupling is a potential point of weakness for the valve. Such couplings suffer from failures in, for example, the gearbox or linkage between the valve stem and the valve closure member, the gearbox or linkages within the external actuator, the stem packing that seals against the stem, etc. Such failures can lead to the valve failing to operate or leakage of the fluid flowing in the conduit from the valve. In the oil and gas industry, in particular, leakage of oil or gas is to be avoided as this can be extremely costly, both environmentally and financially.

It is an object of the invention to provide an improved device for controlling the flow of a fluid through a conduit.

When viewed from a first aspect the invention provides a device for controlling the flow of a fluid through a conduit from an upstream side of the device to a downstream side of the device, the device comprising:
  an upstream valve casing defining an inlet on the upstream side of the device;
  a downstream valve casing defining an outlet aperture on the downstream side of the device;
  a valve core secured between the upstream valve casing and the downstream valve casing, wherein the upstream valve casing, the downstream valve casing and the valve core are formed as discrete parts;
  wherein the valve core comprises a housing defining a control volume;
  a valve member movably mounted on the housing and positioned on the upstream side of the outlet aperture, wherein the valve member is arranged to move reciprocally to selectively open and close the outlet aperture, thereby controlling flow of the fluid through the outlet aperture; and
  an input line defined in the valve core for introducing a fluid pressure into the control volume, wherein the valve member is acted on by the fluid pressure in the control volume to control the position of the valve member.

The present invention provides a device for controlling (e.g. acting to open or shut off) the flow of fluid through a conduit (e.g. in which the device is placed). The flow of fluid through the device is controlled between an upstream side of the device and a downstream side of the device. The device is made up of three main parts, which are formed separately as discrete components: an upstream valve casing, a downstream valve casing and a valve core. These three parts are assembled and secured together to form the device.

The upstream casing defines an (upstream) inlet into the device through which fluid enters the device and the downstream casing defines a (downstream) outlet aperture through which fluid exits the device. The upstream valve casing, the downstream valve casing and the valve core thus together (when assembled) form a flow path through the device from the upstream side to the downstream side.

The flow of fluid through the outlet aperture, and thus through the device from the upstream side to the downstream side, is controlled by a valve member that is movably mounted on a housing that is formed as part of the valve core. The valve member is arranged in the device upstream of the outlet aperture (and thus preferably the housing is also arranged upstream of the outlet aperture) and the valve member is arranged to move reciprocally on the housing of the valve core to selectively open and close the outlet aperture.

The valve member is the movable part of the valve and, as discussed below, may comprise a closure member arranged to engage with the outlet aperture and a piston head that is acted on by the fluid pressure in the control volume. In this arrangement, preferably the closure member and the piston head are kinematically linked (e.g. connected) by a piston shaft (e.g. which are integrally formed together as the valve member).

The housing (e.g. together with the valve member) defines a control volume. A fluid pressure is introduced into the control volume through an input line defined in the valve core (e.g. from a fluid pressure source external to the device). The control volume fluid pressure acts on (e.g. a piston head of) the valve member, so that its movement (and thus position) is controlled by the fluid pressure.

Thus it will be appreciated that the device (e.g. control valve) of the present invention provides a fluid flow control device, the main structural (e.g. static) components of which are three (primary) discrete components: the upstream and downstream casings and the valve core. Such a split piece design is easier to assemble because, in at least preferred embodiments of the present invention, the valve member can be assembled to mount it on the housing of the valve core before the valve core is secured to the upstream and downstream casings (which then surround the valve core and valve member). This contrasts to a conventional design with an integrally cast body in which the upstream and downstream casings and the valve core are formed as one part which, in addition to making it complicated to manufacture, means that the valve member has to be mounted "blind" inside the integrally cast body. This imposes deleterious constraints on such conventional devices. A split piece design therefore gives much greater design freedom to the device as a whole and makes it easier to manufacture and maintain.

In addition to the split piece design, the valve member is actuated using a control fluid, rather than conventional mechanically actuated devices that use mechanical linkages that extend through the valve housing, core and/or casing to an external actuator. Providing a fluid flow control device that does not rely on an external mechanical input simplifies the device owing, in at least preferred embodiments, to the lack of mechanical linkages and gearings. This results in fewer ways in which the device may fail.

Furthermore, using a fluid pressure to control the valve member, and removing the need for a mechanical linkage, helps to reduce the overall size of the fluid flow control system and its weight, and to reduce the likelihood of any fluid (e.g. oil or gas) leakages from the conduit (e.g. a pipe), owing to the lack of a fluid path out of the device via any mechanical linkages. This is very important in the oil and gas industry where it is imperative to prevent leaks.

Using a fluid pressure to control the valve member also helps to provide a fast acting, and thus responsive, fluid flow control device, and may allow higher forces to be applied to the valve member.

The device may be suitable to be used in any type of fluid flow system, and thus may be configured to be installed in any suitable and desired type of conduit. For example, the device may be used in a conduit (e.g. pipeline) for conveying air, water, oil, gas, chemical fluids, etc. Thus the device may be configured to control the flow of air, water, oil, gas, chemical fluids, etc., therethrough.

The device and the components thereof may be arranged in any suitable and desired way. In a preferred embodiment the device comprises an axial flow device. Thus preferably the inlet, the valve member and the outlet aperture (and preferably also the housing) are arranged coaxially with respect to each other about an axis. In a preferred embodiment the inlet, the valve member and the outlet aperture (and preferably also the housing) are substantially rotationally symmetric about the axis. Preferably the axis extends in a direction collinearly with the general (e.g. average) direction of fluid flow through the outlet aperture.

Preferably the axis of the device is parallel to, e.g. collinear with, the axis of the conduit (e.g. pipe) in which the device is arranged. It will be appreciated that this arrangement allows the device to be easily fitted within an existing pipe, e.g. inserted inside a pipe at a flange or even in a continuous section of pipework, as the largest dimension of the device is likely to be in that in which the valve member moves. Therefore, no additional space may be required to house the device and it can be retro-fitted rapidly and at low cost in most sections of pipework or at most pipe joints without any significant alteration in the pipework. This contrasts to conventional devices with large mechanical control linkages that may require the pipework layout to be redesigned for the new flow control equipment to be incorporated.

Devices in accordance the present invention can therefore significantly reduce the cost and work required to incorporate them into an existing system. The arrangements mentioned above, in particular, as well as other embodiments, also allow devices in accordance with the present invention to facilitate very high mass flows for a given conduit diameter and pressure compared to conventional mechanically actuated axial flow devices. This creates a very flexible device which can be used for many different applications.

The upstream casing preferably comprises a flange for mounting to a conduit, e.g. using a flange bolt circle. Preferably the upstream casing comprises a flange for mounting to the valve core, e.g. using a flange bolt circle. Preferably the flange(s) extend radially from the upstream casing. Preferably the inner dimension (e.g. diameter) of the upstream casing at the flange for mounting to the valve core is greater than the inner dimension (e.g. diameter) of the upstream casing at the flange for mounting to the conduit.

The downstream casing preferably comprises a flange for mounting to a conduit, e.g. using a flange bolt circle. Preferably the downstream casing comprises a flange for mounting to the valve core, e.g. using a flange bolt circle. Preferably the flange(s) extend radially from the downstream casing. Preferably the inner dimension (e.g. diameter) of the downstream casing at the flange for mounting to the valve core is greater than the inner dimension (e.g. diameter) of the downstream casing at the flange for mounting to the conduit.

The valve core preferably comprises flanges for mounting to and securing between the upstream and downstream casings, e.g. using a flange bolt circle. Thus, for example, the valve core, comprising the housing with the valve member mounted thereon, is sandwiched between the upstream and downstream casings of the device. Preferably the flange(s) extend radially from the valve core.

The upstream valve casing, the downstream valve casing and the valve core are (each) formed as discrete parts. Thus preferably the device is manufactured in its separate component parts (i.e. the upstream valve casing, the downstream valve casing and the valve core, etc.) and then the device is assembled from these discrete parts. Preferably, when assembling the device, first the valve member is mounted on the housing, and then the downstream valve casing (and preferably also the upstream valve casing) are connected and secured to the valve core, thus surrounding the valve core, housing and valve member.

Preferably each of the upstream valve casing and the downstream valve casing are integrally formed. Thus preferably the rim of the upstream valve casing forming the inlet of the upstream valve casing is integrally formed with the rest of the upstream valve casing (and not an insert which is attached as a separate part thereto). Preferably the rim of the downstream valve casing forming the outlet aperture of the downstream valve casing is integrally formed with the rest of the downstream valve casing (and not an insert which is attached as a separate part thereto).

Preferably the dimension (e.g. diameter) of the outlet aperture (e.g. in a radial direction perpendicular to the main axis of the device (and the outlet aperture) is less than the (e.g. maximum) corresponding dimension (e.g. diameter) of the valve housing (e.g. in a radial direction perpendicular to the main axis of the device (and to the valve member)). Such an arrangement in which the valve housing is larger than the outlet aperture (particularly in a device in which the outlet aperture is an integral part of the downstream valve casing) means that while the valve housing may have to be assembled (and, e.g. the valve member mounted on the housing) prior to the downstream valve casing being attached to the valve core (e.g. because the valve housing and, e.g. valve member, may be too large to be inserted and assembled through the outlet aperture), the valve housing (and, e.g., valve member) may be able to have a larger (relative) size than in conventional devices, thus helping the device to allow a greater flow capacity (e.g. for a device of a particular size) than conventional devices.

The housing may be formed in any suitable and desired way as part of the valve core. In some embodiments, at least part (e.g. all) of the housing is integrally formed with the rest of the valve core (e.g. with the part of the valve core in which the fluid input line is defined and which is secured between (e.g. contacts) the upstream and downstream casings). In some embodiments, at least part (e.g. all) of the housing is formed as a separate part from the rest of the valve core and is attached thereto. Preferably, at least part of the part of the housing defining the (e.g. upstream side of the) control volume may be formed as a separate part from the rest of the valve core and attached to the rest of the (e.g. housing of the) valve core to form the control volume. This may allow access to assemble the valve member in the housing and then to attach this part (e.g. upstream side) of the housing to enclose the control volume.

The fluid pressure in the control volume acts on the valve member. Preferably the fluid pressure in the control volume acts directly on the valve member. Thus preferably (e.g. a face of) the valve member defines (e.g. a wall of) the control volume together with the housing. Preferably the valve member comprises a piston head that is arranged to move within the control volume. Preferably the fluid pressure acts on (e.g. a face of) the piston head. Preferably (e.g. a face of) the piston head defines (e.g. a wall of) the control volume together with the housing.

The device may comprise a piston liner, arranged around (e.g. the piston head of) the valve member. The piston liner may define (e.g. a boundary of) the control volume. The piston liner may be mounted on the housing. It may be mounted on the valve member. The piston liner may be arranged (e.g. radially) between the (e.g. piston head of the) valve member and the housing. The piston liner may comprise a hollow sleeve. The (e.g. piston head of the) valve member may be arranged to move longitudinally within the piston liner.

Preferably the piston liner and the housing are discrete components. Providing a separate piston liner may help to reduce the complexity of manufacturing. The piston liner may at least partially define the control volume. If the control volume is defined by the piston liner, rather than the housing, then it is possible that the housing may be manufactured to a lower tolerance, thus helping to reduce manufacturing time and costs.

The piston liner may be replaceably mounted. This means that the piston liner can be removed and replaced if it becomes worn or damaged, which can increase the service life of the device.

The valve member, which is movably mounted on the housing and positioned on the upstream side of the outlet aperture, may be arranged in the device in any suitable and desired way in which it achieves its purpose of moving in a reciprocal manner to open and close the outlet aperture, to thereby control flow of the fluid through the outlet aperture. As the valve member is positioned on the upstream side of the outlet aperture and mounted on the housing, preferably the housing is also positioned on the upstream side of the outlet aperture.

In a preferred embodiment the valve member is mounted (e.g. coaxially) on the inside of the housing. Thus preferably the valve member is arranged to move (e.g. axially) out from the housing towards the outlet aperture to close the outlet aperture and arranged to move (e.g. axially) into the housing towards the outlet aperture to open the outlet aperture.

Preferably the valve member is arranged to be movably mounted such that it comes into contact with the downstream casing (e.g. the rim of the outlet aperture) to close the outlet aperture. Preferably the valve member comprises a closure member arranged to engage with the downstream casing (e.g. the rim of the outlet aperture) to close the outlet aperture. Preferably the closure member is attached to the piston of the valve member.

Preferably the closure member is cylindrical, e.g. with a circular cross section, and, e.g., having an axis of symmetry (along which the cross-sectional shape of the cylinder is projected and the closure member moves) along the main axis of the device. Thus preferably the closure member comprises a cylindrical sleeve mounted on the housing of the valve core and attached to the rest of the valve member. As above, preferably the dimension (e.g. diameter) of the outlet aperture (e.g. in a radial direction perpendicular to the main axis of the device (and the outlet aperture) is less than the (e.g. maximum) corresponding dimension (e.g. diameter) of the valve housing (e.g. in a radial direction perpendicular to the main axis of the device (and the valve housing).

Preferably the closure member engages with the downstream casing around an annulus at the distal (downstream) end of the closure member. Thus preferably the closure member comprises a (e.g. annular) seal at (e.g. around) the distal (downstream) end of the closure member, for sealing against the downstream casing. The downstream casing may comprise a (e.g. hardened metal) detachable rim against which the closure member is arranged to engage (and thus seal against). In this embodiment the closure member engages with and seals against the detachable rim rather than the main body of the downstream casing. Providing a detachable rim as an insert for the valve seat enables a different (e.g. hardened) material to be provided which is more suitable for such a high wear region and also allows the detachable rim to be removed and replaced, when necessary.

Preferably the closure member comprises an end face at the distal (downstream) end of the closure member. Preferably the end face is substantially perpendicular to the axis of symmetry of the closure member (e.g. lies in the radial direction of the device). Preferably the closure member is attached to the rest of the valve member (e.g. to the piston of the valve member) via the end face of the closure member.

Preferably the end face of the closure member comprises one or more apertures formed therein to allow fluid in the conduit (e.g. from the downstream side) to pass therethrough (e.g. into the housing but preferably not through to the upstream side of the device). This helps to pressure balance the valve member, e.g. so that the upstream pressure in the conduit does not apply any significant opening or closing forces on the closure member and valve member, and does not, in at least some embodiments, act to apply any forces on the valve member when there are changes in the upstream pressure in the conduit. As will be discussed below, the aperture(s) formed in the end face of the closure member also allows the downstream pressure in the conduit to act on the (e.g. piston head of the) valve member, e.g. in addition to the control fluid pressure.

The fluid pressure may be introduced through the input line in the valve core into the control volume in any suitable and desired way. In a preferred embodiment the device comprises a fluid pressure control system for supplying a fluid through the input line into the control volume to provide the fluid pressure in the control volume to act on the valve member. Preferably the fluid pressure control system is arranged to control (e.g. set) the fluid pressure in the control volume, i.e. to control the position of the valve member.

The fluid pressure control system may be provided in any suitable and desired way. Preferably the fluid pressure control system comprises a source of fluid. The source of fluid may be provided locally to (and, e.g., dedicated (e.g. solely) to) the device or the source of fluid may comprise a (e.g. distributed) fluid line into which the device is plumbed.

Preferably the fluid pressure control system comprises a pump fluidly connected to the input line (and, e.g. to the source of fluid), wherein the pump is arranged to control the (e.g. volumetric rate of) fluid input into (or removed from) the control volume (i.e. in order to control the fluid pressure in the control volume and thus the position (and, e.g., rate of movement) of the valve member). The device may comprise its own (e.g. dedicated) pump, e.g. when the source of fluid is provided locally to the device. Alternatively, e.g. when the device is plumbed into a fluid line, the fluid line may comprise a pump for the whole of the fluid line and thus the device may not comprise a separate pump.

Preferably the fluid pressure control system comprises an electronic control arranged to control the operation of the pump. In one embodiment the electronic control may simply comprise a (e.g. manually operated) switch. In other embodiments, e.g. when the fluid pressure control system receives input(s) from sensor(s), the electronic control may comprise a processing circuit arranged to control the operation of the pump (e.g. in response to the input(s)).

The electronic control may be provided locally to the device (e.g. when the pump is manually operated). In one embodiment the electronic control is remote from the device, e.g. in a control room.

The (e.g. electronic control of the) fluid pressure control system may receive (and thus the device may comprise) one or more inputs, e.g. which the fluid pressure control system uses to control (e.g. set) the fluid pressure in the control volume (e.g. by the electronic control controlling operation of the pump to set the fluid pressure).

For example, the device may comprise an upstream pressure sensor arranged to determine the pressure in the conduit upstream of the device and/or a downstream pressure sensor arranged to determine the pressure in the conduit downstream of the device. Preferably the upstream pressure sensor and/or the downstream pressure sensor are connected to the fluid pressure control system (and thus preferably the fluid pressure control system is arranged to receive the determined upstream pressure and/or downstream pressure from the upstream pressure sensor and/or the downstream pressure sensor respectively). Preferably the fluid pressure control system uses the upstream and/or downstream pressure of the fluid in the conduit (e.g. as determined by and received from the upstream pressure sensor and/or the downstream pressure sensor respectively) to control the fluid pressure in the control volume (to thus control the position of the valve member).

Preferably the device comprises a position sensor (e.g. comprising a control unit) arranged to determine (e.g. detect) the position of the valve member (e.g. relative to the housing and/or the outlet aperture). This helps the device to position the valve member as desired, using the fluid pressure in the control volume, to control the flow of fluid through the device.

The position sensor may comprise a magnetic field sensor. The device may comprise a magnet mounted such that it is displaced by the movement of the valve member in the same direction of the valve member. The magnetic field sensor may mounted on the housing, e.g. in a fixed position relative to the outlet aperture, such that the magnet is moved by the valve member relative the magnetic field sensor. The magnetic field sensor may be arranged to detect the changes in the magnetic field it experiences from the magnet as it moves relative to sensor, which allows the position of the valve member to be determined.

The position sensor may comprise multiple magnetic field sensors. It will be appreciated that by providing multiple magnetic field sensors, a more accurate determination of the position of the valve member may be made (e.g. owing to the more accurate measurement of the movement of the magnetic field of the magnet that may be made). This may be performed in a more economical way than by using a multiple axis magnetic field sensor. Furthermore, in at least preferred embodiments, providing multiple magnetic field sensors may allow the measurements to be automatically calibrated for changes (e.g. degradation) of the magnetic field of the magnet with time and/or temperature.

The magnet may be mounted on or relative to the valve member. The magnet may comprise any suitable and desired magnet. Preferably the magnet comprises a permanent magnet. Preferably the device comprises a sheath surrounding the magnet. The sheath helps to protect the magnet, which may be quite brittle. The sheath may help to avoid contact of the magnet with the working fluid of the device (i.e. the fluid flowing through the conduit whose flow is being controlled). This may be required, for example, when the device is used in the water industry, for regulatory approval. The sheath may also help to reduce the friction of the magnet as it is displaced.

Preferably the magnet is longitudinally extended (i.e. having a length greater than its width (e.g. diameter)), e.g. in the direction in which the valve member (and thus the magnet) is arranged to be displaced. Preferably the magnet is cylindrical, e.g. being longitudinally extended in the direction in which the cross-section of the cylinder is projected (along the length of the cylinder).

The magnet may be mounted on or relative to the valve member in any suitable and desired way. In a preferred set of embodiments, the magnet is mounted such that the magnet retains the same circumferential and/or radial position (e.g. relative to the housing and/or axis of the device) when the magnet is displaced by the valve member, e.g. even when the valve member rotates (circumferentially) relative to the housing.

The magnet retaining the same circumferential and/or radial position during operation helps to maintain the same positional relationship between the magnet and the magnetic field sensors (apart from the intended (e.g. axial) displacement of the magnet with the valve member) and thus maintains a consistent environment for (e.g. the (e.g. non-ferrous) material (such as plastic or metal) of the device between) the magnet and the magnetic field sensors. This helps the position of the valve member to be determined accurately, e.g. even when the valve member rotates (circumferentially) relative to the housing (which can be common during operation), because the magnetic field strength and angle experienced by the magnetic field sensors does not vary with rotation of the valve member. Furthermore, the fixed circumferential and/or radial position helps to preserve the magnetic field angle experienced by the magnetic field sensors as the magnet deteriorates.

In one set of embodiments, the magnet is mounted (directly) on (i.e. attached to) the valve member, e.g. such that the magnet is fixedly (e.g. rigidly) connected to the valve member. Thus the movement of the magnet corresponds directly to the movement of the valve member. The magnet may be mounted along the axis of the valve member, e.g. within a piston shaft of the valve member (locating the magnet within the valve member helps to isolate the magnet from the working fluid of the fluid flow control device). Thus, for example, the magnet is longitudinally extended along the axis of the valve member. The magnet may comprise an annular (e.g. circumferentially symmetric) magnet, e.g. mounted around the (e.g. axis of the) valve member. Providing a magnet at the central axis of the valve member or circumferentially extending around the central axis of the valve member helps to retain the magnet at the same circumferential and radial position.

In one set of embodiments the magnet is mounted relative (but not necessarily attached) to the valve member. Thus preferably the magnet is discrete (i.e. a separate component) from the valve member. Preferably the magnet is acted on by the valve member such that it is displaced by the valve member in the same direction as the displacement of the valve member.

In some embodiments the magnet may be acted on directly by the valve member, e.g. the valve member may contact the magnet directly. In some embodiments the magnet may be acted on indirectly by the valve member, e.g. the valve member may not contact the magnet directly. Instead, the valve member may act on a sheath around the magnet or on another component between the valve member and the magnet.

In one embodiment, the fluid flow control device comprises a spacer between the valve member and the magnet, wherein the valve member is arranged to displace (e.g. directly contact) the spacer so to displace the magnet (e.g. the spacer may in turn contact the magnet (or its sheath) directly). A spacer may be used to help to position the magnet relative (e.g. closer) to the magnetic field sensors.

In one set of embodiments (e.g. when the magnet is not attached to or integral with the valve member) the magnet is biased towards the valve member. Preferably the fluid flow control device comprises a biasing member (e.g. a (e.g. compression) spring) arranged to bias the magnet towards the valve member. Preferably the magnet is located between the valve member and the biasing member. Biasing the magnet towards the valve member helps to maintain the same (e.g. axial) position of the magnet relative to the valve member (e.g. to keep the magnet (or the sheath or the spacer) in contact with the valve member).

Preferably the biasing member is arranged to (e.g. exert a sufficient biasing force against the magnet to) maintain the magnet (or the sheath or the spacer) in contact with the valve member. However, preferably the biasing force exerted by the biasing member on the valve member (e.g. via the magnet) is negligible (e.g. about 1% of) compared to the other forces acting on the valve member, e.g. from the (upstream or downstream) fluid pressure of the working fluid, from a control pressure of a control fluid acting on the valve member and/or from a spring force of a (main) biasing spring acting on the valve member.

In one set of embodiments (e.g. when the magnet is not (rigidly) attached to or integral with the valve member) the fluid flow control device comprises a (e.g. longitudinally extended, e.g. in the axial direction) cavity in which the magnet is located and arranged to be displaced. Preferably the biasing member is located in the cavity, e.g. the magnet is located between the valve member and the biasing member. Preferably the biasing member is made from a non-ferrous material.

Preferably, when the magnet is located within a cavity, the cavity comprises a pressure balancing aperture. This is provided to help any build-up of unwanted pressure within the cavity to be vented, e.g. to a control space (within the device) with which the cavity is fluidly connected via the pressure balancing aperture.

The displacement of the magnet in the direction towards the valve member may be restricted by a retaining feature of the magnet assembly and/or the valve housing. Preferably the magnet comprises one or more grooves which extend axially along the magnet and the valve housing comprises a stopping member protruding from the valve housing (e.g. partially over the entrance to the cavity), wherein the stopping member is arranged to project into the one or more grooves. Preferably the stopping member is complementary to the one or more grooves, e.g. such that the stopping member runs in the one or more grooves during displacement of the magnet and such that the stopping member abuts the end of the groove at the desired (e.g. maximum) displacement of the magnet, thereby halting the displacement of the magnet and retaining it in the cavity. Preferably the engagement of the stopping member with the one or more grooves prevents rotation of the magnet, such that circumferential asymmetry of the magnetic field does not affect the accuracy of the position measurement. Preferably the stopping member is arranged to engage with the end of the one or more grooves (e.g. only) when the valve member is removed from the valve housing. Thus, in at least preferred embodiments, during normal operation of the fluid flow control device, the displacement of the magnet is such that the stopping member does not act to restrict displacement of the magnet.

The magnet may be mounted relative to the valve member (and thus, for example, the cavity may be formed) in any suitable and desired part of the fluid flow device. Preferably the magnet is movably mounted on the (e.g. valve core of the) housing. Preferably the cavity is formed in the (e.g. valve core of the) housing. Preferably the (e.g. sheath of the) magnet (or, e.g., the cavity) is exposed to the working fluid (and thus, for example, the operating pressure of the fluid) flowing through the fluid flow control device.

Preferably the magnet is (e.g. movably) mounted at a position that is radially offset from the central axis of the fluid flow control device (and thus the valve member). This may help to position the magnet closer (e.g. radially) to the magnetic field sensors. When the magnet is mounted relative to (and thus not on) the valve member, preferably it is mounted (e.g. in the cavity) such that it retains its circumferential and/or radial position, e.g. even when the valve member rotates circumferentially.

In one embodiment, the valve member comprises an (e.g. circumferentially extended) annular groove for receiving (e.g. locating) the end of the magnet (or the sheath or the spacer). The end of the magnet (or the sheath or the spacer) thus preferably comes into contact with (and is thus moved by) the valve member in the annular groove. The groove helps to maintain the radial position of the magnet while allowing the valve member to rotate, e.g., circumferentially (and thus helps to magnet to maintain its circumferential position even when the valve member, and thus the magnet, is being moved in an axial direction).

The magnet may be any suitable and desired size. Preferably the magnet has a length (e.g. in the axial direction) that is greater than the maximum (e.g. axial) displacement of the valve member. This helps to provide a (e.g. axial) position on the (e.g. housing of the) fluid flow control device at which the magnet overlaps at all (e.g. axial) displacements of the valve member (and thus the magnet). Preferably the length of the magnet is greater than or equal to the sum of the maximum (e.g. axial) displacement of the valve member and the (e.g. axial) spread of the magnetic field sensors. This allows the magnetic field sensors to be (and in an embodiment they are) positioned such that they overlap with the magnet at all (e.g. axial) displacements of the valve member.

The plurality of magnetic field sensors may be mounted at the plurality of different positions on the valve housing in any suitable and desired way. In one embodiment the plurality of magnetic field sensors are mounted on an outer casing of the valve housing. This allows easy access to the magnetic field sensors, e.g. for attaching readout wiring thereto. In a preferred set of embodiments, the plurality of magnetic field sensors are mounted on or in the valve core of the housing. This may allow the magnetic field sensors to be located close to the magnet.

For example, when the magnet is movably mounted in (e.g. the valve core of) the housing, the plurality of magnetic field sensors may be located very close to the magnet. This helps to reduce the amount of material between the magnet and the magnetic field sensors, which helps to allow the magnetic field sensors to make an accurate measurement of the magnetic field of the magnet, e.g. owing to the increased linearity and gradient of the magnetic field strength experienced by the magnetic field sensors. In one embodiment, the magnetic field sensors are mounted within 30 mm of the magnet (e.g. in the radial direction), e.g. approximately 20 mm from the magnet.

In one embodiment the (e.g. valve core of the) valve housing comprises one or more cavities in which the magnetic field sensors are located. The plurality of magnetic field sensors may be arranged in the same cavity or in a plurality of respective cavities.

Preferably the magnetic field sensors (and thus, for example, the one or more cavities for the magnetic field sensors) are arranged at (e.g. exposed to) atmospheric pressure. Preferably the magnetic field sensors are isolated from (i.e. not exposed to) the (e.g. fluid pressure of the) working fluid of the fluid flow control device, e.g. owing to where on or in the valve housing they are mounted. This allows the magnetic field sensors (and, e.g., any associated electronics) to operate in a relatively safe environment and be accessed relatively easily. The magnetic field sensors may, for example, not require complicated sealing mechanisms.

In a preferred set of embodiments, the plurality of magnetic field sensors are fixedly (e.g. rigidly) mounted on the valve housing. Providing static magnetic field sensors helps, for example, to simplify any connecting wiring and/or electronics. It may also allow static seals (which are relatively simple and safe, e.g. compared to dynamic seals) to be used to seal the magnetic fields sensors in the housing.

The plurality of magnetic field sensors may be provided at a plurality of different (respective) positions in any suitable and desired way, e.g. so that they experience different magnetic field strength of the magnet from each other. In one embodiment the plurality of magnetic field sensors are radially spaced from each other. Preferably the plurality of magnetic field sensors are axially spaced from each other. In other embodiments the magnetic field sensors are angled between the radial and axial directions. Preferably the magnetic field sensors are angled so that the radial field lines from the magnet cut through the tops of the magnetic (e.g. Hall effect) sensors.

The plurality of magnetic field sensors may be spaced from each other by mounting them on a plurality of different (respective) substrates (e.g. printed circuit boards), e.g. for locating them in a plurality of different cavities in the valve housing. Alternatively, the plurality of magnetic field sensors are mounted, but spaced from each other, on the same substrate (e.g. printed circuit board), e.g. for locating the magnetic field sensors in the same cavity.

Thus, as appropriate, the one or more cavities may be longitudinally extended, e.g. radially or axially. For example, when the plurality of magnetic field sensors are located in the same cavity, the cavity may extend longitudinally in the axial direction (and thus the magnetic field sensors may be spaced axially from each other). Or, for example, when the plurality of magnetic field sensors are located in a plurality of cavities, the cavities may be spaced axially from each other (e.g. at the same circumferential position) but extend radially.

The plurality of magnetic field sensors may be spaced from each other by any suitable and desired distance. Preferably the magnetic field sensors are positioned on the valve housing within the maximum (e.g. axial) displacement of the magnet, e.g. when the magnetic field sensors are axially spaced from each other. This allows the magnetic field sensors to overlap with the magnet at all displacements of the magnet. However, in embodiments wherein the magnetic field sensors are multiple axis sensors, it may be possible to use a smaller magnet.

The magnetic field sensors may be any suitable and desired type of magnetic field sensors. In one set of embodiments the magnetic field sensors comprise a plurality of magnetic Hall effect sensors. The magnetic field sensors may comprise multiple axis sensors. The multiple axis sensors may be configured to determine the magnitude of the magnetic field in two (e.g. horizontal and vertical) axes. A magnetic field angle may be calculated from the output of the single or multiple axis magnetic field sensors. However, the magnetic field sensors may comprise (e.g. cheaper) magnetic field angle or single axis sensors. A position of the valve member may be determined by (e.g. the control unit of) the position sensor from a calculated or a measured magnetic field angle. Using a magnetic field angle to determine the position of the valve member, rather than a magnitude of the magnetic field, can improve the range of displacements of the valve member that may be determined. Furthermore, the determination may be independent of fluctuations in temperature.

In one embodiment, the magnetic field sensors may comprise Hall effect switches (e.g. instead of or in addition to other magnetic field sensors). The Hall effect switches are preferably positioned on the valve housing at or outside the maximum (e.g. axial) displacement of the magnet (e.g. in either direction). The Hall effect switches may thus use the discontinuity in the magnet field of the magnet to detect that the magnet has reached its maximum (e.g. axial) displacement (in either direction). Using Hall effect switches in this way may be suitable for an on-off or shut-off valve, or to calibrate the measurements from the (e.g. intermediately positioned) other magnetic field sensors.

The fluid flow control device may comprise any suitable and desired number of magnetic field sensors. In a preferred set of embodiments, the fluid flow control device comprises two or more magnetic field sensors, e.g. three or more magnetic field sensors. Having three or more magnetic field sensors provides some redundancy, e.g. were one of the sensors to stop working.

In a preferred set of embodiments, the position sensor comprises a control unit arranged to receive an output (e.g. a measurement of the magnetic field (e.g. strength and/or angle) of the magnet) from the magnetic field sensors. The control unit may be connected via a wired or wireless connection to the magnetic field sensors. Preferably the control unit is arranged to determine the position of the valve member, from the output received from the magnetic field sensors. Preferably the control unit comprises processing circuitry arranged to receive the output received from the magnetic field sensors and to calculate the position of the valve member from the measured magnetic field (e.g. strength and/or angle). Preferably the processing circuitry is arranged to perform one or more (e.g. all) of the functions of the control unit, as appropriate.

The position of the valve member may be determined in any suitable and desired way. Measuring the position of the valve member helps to provide reassurance (e.g. to a user) that a valve aperture is fully open or fully closed, as desired. The position of the valve member may be used to determine the amount by which the valve member is throttling the flow of fluid through the valve aperture. This, in turn, may allow the valve member to be positioned in a particular position, e.g. to deliver a desired amount of throttling. The position of the valve member may be used to allow the flow rate through the fluid flow control device to be determined (or estimated). The position of the valve member may be used as part of health checks and/or condition monitoring of the fluid flow control device.

In a preferred set of embodiments, the determined position of the valve member is used as part of a (e.g. active) feedback control loop. Thus preferably the (e.g. control unit of the) position sensor is arranged to control operation of the fluid flow control device using the determined position of the valve member, e.g. to position the valve member at a particular position. This may be done in any suitable and desired way, e.g. owing to the type of fluid flow control device being used. For example, the (e.g. control unit of the) position sensor may (e.g. control a pilot valve to) set a control pressure in the fluid flow control device (e.g. using the determined position of the valve member) to displace the valve member to a particular position.

Thus preferably the (e.g. control unit of the) position sensor is connected to the (e.g. electronic control of the) fluid pressure control system (and thus preferably the fluid pressure control system is arranged to receive the determined position of the valve member from the (e.g. control unit of the) position sensor). Preferably the (e.g. electronic control of the) fluid pressure control system uses the position of the valve member (e.g. as determined by and received from the (e.g. control unit of the) position sensor) to control the fluid pressure in the control volume (e.g. by the electronic control operating the pump to set the fluid pressure). This allows the position of the valve member to be actively adjusted, so that, for example, that the fluid flow control valve may be controlled to operate in a particular way, e.g. at a constant flow rate.

In a preferred set of embodiments, the (e.g. control unit of the) position sensor is arranged to perform error minimisation on the output from the magnetic field sensors to determine the position of the valve member. The error minimisation exploits the multiple measurements from the multiple magnetic field sensors and helps to account for any changes of the magnet with temperature or time.

Furthermore, depending on the error minimisation algorithm used, the temperature and/or the magnetisation of the magnet may also be determined (and thus in an embodiment the (e.g. control unit of the) position sensor is arranged to determine the temperature and/or the magnetisation of the magnet using the output from the magnetic field sensors).

The fluid in the control volume could be any suitable and desired fluid, e.g. a liquid (thus applying a hydraulic pressure) or a gas (thus applying a pneumatic pressure). The choice of fluid to use may depend on the desired operation of the device and the fluid pressure that is to be provided. Preferably the "control" fluid in the control volume comprises a fluid that is less damaging environmentally than the fluid flowing in the conduit that is being controlled by the device. It will be appreciated that the control fluid is likely to have a limited volume (e.g. compared to the volume of fluid flowing through the conduit) and so if this leaks, the environmental damage this causes may be minimised.

The fluid to introduce into the control volume could be taken from the fluid in the conduit whose flow is being controlled by the device. However, in a preferred embodiment the device is configured to keep the fluid in the conduit (whose flow is being controlled by the device) separate from the fluid in the control volume. This helps to reduce contamination (in either direction) between the control fluid and the line fluid (the fluid in the conduit).

Preferably the fluid in the control volume (and the input line) is isolated from the fluid in the conduit. Thus preferably the control volume and the input line are sealed, e.g. from the fluid in the conduit. Preferably the device comprises one or more seals for sealing the control volume, e.g. between the valve member (e.g. the part of the valve member which moves in the control volume, e.g. the piston head) and the housing (e.g. the part thereof which defines the control volume). The seal(s) may be provided on the housing and/or on the valve member.

In some embodiments the device comprises a (e.g. compression) spring (e.g. within the housing) arranged to act on the valve member (i.e. in addition to the fluid pressure). It will be appreciated that the split piece nature of the device is particularly convenient for including and assembling a spring in the device, as the spring may be (and preferably is) assembled with the valve member and the housing, before the valve core is secured between the upstream and downstream casings.

The spring may be arranged to act on any suitable and desired part of the valve member, and in any suitable and desired direction. Preferably (e.g. when the fluid pressure acts on only one side of the valve member) the spring is arranged to act on the valve member in the opposite (e.g. axial) direction to the direction in which the fluid pressure acts on the valve member. Thus preferably the valve member is acted on by (at least) the fluid pressure and the spring force to control the position of the valve member.

In one embodiment the spring is arranged to act to bias the valve member in the downstream direction (i.e. to bias the valve member towards closing the outlet aperture). Preferably, in this embodiment, the spring is located between (and thus engages and exerts a force against) the housing of the valve core and the closure member.

In one embodiment the spring is arranged to act to bias the valve member in the upstream direction (i.e. to bias the valve member towards opening the outlet aperture). Preferably, in this embodiment, the spring is located between (and thus engages and exerts a force against) the housing of the valve core and the piston head of the valve member.

The device may be arranged to have defined operating characteristics, e.g. particularly with regard to its "fail safe" mode of operation. This is preferably to provide the device with a defined mode of operation in the event of a loss of (or significant reduction in) the fluid pressure. This may be caused, for example, by a loss of power to the device (e.g. to the fluid pressure control system) or by a leak of the control fluid from the control volume (e.g. owing to a failure of a seal for the control volume). In the former situation, the fluid pressure in the control volume is likely to be reduced to below the pressure acting on the valve member in the opposite direction. In the latter situation, the leak of the control fluid is likely to lead to the equalisation of the fluid pressure acting on the valve member in each direction. In these situations, the failure mode of the valve may also depend on whether the device comprises a spring acting on the valve member.

In one embodiment, in a "fail closed" design, the device is configured to (e.g. move the valve member to) close the outlet aperture when there is a loss of (or significant reduction in) the fluid pressure.

In one embodiment, in a "fail open" design, the device is configured to (e.g. move the valve member to) open the outlet aperture when there is a loss of (or significant reduction in) the fluid pressure.

When the device is configured to fail closed or open, preferably the valve member is biased (e.g. by a spring) in the downstream or upstream direction respectively.

In one embodiment, in a "fail in position" design, the device is configured to retain the valve member in the same position when there is a loss of (or significant reduction in) the fluid pressure (i.e. in the position the valve member is in when the loss of fluid pressure occurs).

Such "fail safe" modes of operation may be chosen depending on the operating requirements of the system in which the device is installed.

In one set of (e.g. "fail closed") embodiments, the control volume is arranged such that the fluid pressure acts to bias (and thus move) the valve member in the upstream direction (i.e. to open the outlet aperture), e.g. such that the fluid pressure acts on a downstream face of the (e.g. piston head of the) valve member. Thus, in the event of a loss of fluid pressure, the valve member experiences a drop in the pressure acting on it that would ordinarily bias it in the upstream direction, thus preferably moving the valve member in the downstream direction to close the valve aperture.

In this set of embodiments, preferably the device (e.g. the housing and valve member) is arranged such that the downstream pressure of the fluid in the conduit acts to bias (and thus move) the valve member in the downstream direction (i.e. to close the outlet aperture) (e.g. differentially with the control fluid pressure acting in the opposite direction on the valve member). Preferably the valve member is acted on by the downstream pressure in the conduit and the fluid pressure in the control volume so as to be moved (inter alia) by the difference between these pressures to control the position of the valve member.

Preferably an upstream face of the (e.g. piston head of the) valve member is exposed to the downstream pressure, e.g. such that the downstream pressure acts on the upstream face of the (e.g. piston head of the) valve member. Thus, in the event of a loss of fluid pressure, the downstream pressure acts on the valve member to move the valve member in the downstream direction to close the valve aperture.

Preferably the housing comprises a channel from the downstream side of the housing (and, e.g., the valve member) that is fluidly connected to the upstream face of the (e.g. piston head of the) valve member. This provides a fluid route through for the downstream pressure to act on an upstream face of the valve member. Preferably, when the closure member of the valve member comprises aperture(s) therethrough, the aperture(s) are fluidly connected, e.g. via a channel, to the upstream side of the (e.g. piston head of the) valve member. Thus, even when the valve member has (e.g. fully) closed the outlet aperture, the downstream pressure can act on the upstream face of the valve member.

Preferably, when the device comprises a spring, the spring is arranged to act to bias the valve member in the downstream direction (i.e. to bias the valve member towards closing the outlet aperture). Thus preferably the spring acts on the valve member, along with the downstream pressure, to bias the valve member in the downstream direction against the control fluid pressure, such that the valve member closes the outlet aperture in the event of a loss of (or significant drop in) the control fluid pressure.

In one set of (e.g. "fail open") embodiments, the control volume is arranged such that the fluid pressure acts to bias (and thus move) the valve member in the downstream direction (i.e. to close the outlet aperture), e.g. such that the fluid pressure acts on an upstream face of the (e.g. piston head of the) valve member. Thus, in the event of a loss of fluid pressure, the valve member experiences a drop in the pressure acting on it that would ordinarily bias it in the downstream direction, thus preferably moving the valve member in the upstream direction to open the valve aperture.

In this set of embodiments, preferably the device (e.g. the housing and valve member) is arranged such that the downstream pressure of the fluid in the conduit acts to bias (and thus move) the valve member in the upstream direction (i.e. to open the outlet aperture) (e.g. differentially with the control fluid pressure acting in the opposite direction on the valve member). Preferably a downstream face of the (e.g. piston head of the) valve member is exposed to the downstream pressure, e.g. such that the downstream pressure acts on the downstream face of the (e.g. piston head of the) valve member. Thus, in the event of a loss of fluid pressure, the downstream pressure acts on the valve member to move the valve member in the upstream direction to open the valve aperture.

Preferably the housing comprises a channel from the downstream side of the housing (and, e.g., the valve member) that is fluidly connected to the downstream face of the (e.g. piston head of the) valve member. This provides a fluid route through for the downstream pressure to act on a downstream face of the valve member. Preferably, when the closure member of the valve member comprises aperture(s) therethrough, the aperture(s) are fluidly connected, e.g. via a channel, to the downstream side of the (e.g. piston head of the) valve member. Thus, even when the valve member has (e.g. fully) closed the outlet aperture, the downstream pressure can act on the downstream face of the valve member.

Preferably, when the device comprises a spring, the spring is arranged to act to bias the valve member in the upstream direction (i.e. to bias the valve member towards opening the outlet aperture). Thus preferably the spring acts on the valve member, along with the downstream pressure, to bias the valve member in the upstream direction against the control fluid pressure, such that the valve member opens the outlet aperture in the event of a loss of (or significant drop in) the control fluid pressure.

In one set of (e.g. "fail in position") embodiments, the device comprises two control volumes. Preferably the device comprises two (e.g. fluidly separate) input lines defined in the valve core for introducing fluid pressures into the two control volumes respectively. Preferably the valve member is acted on by the difference in the fluid pressures in the two control volumes to control the position of the valve member.

Preferably the device comprises a fluid pressure control system for (e.g. independently) supplying a fluid through the two input lines into the two control volumes respective to provide the fluid pressures in the respective control volumes to act on the valve member. Thus each input line and control volume may have fluid supplied thereto by a separate control system or the same control system may be arranged to supply fluid to both input lines and respective control volumes, e.g. independently. Preferably the fluid pressure control system is arranged to control (e.g. set) the fluid pressure in each of the control volumes, i.e. to control the position of the valve member.

One of the control volumes is preferably arranged such that the fluid pressure acts to bias (and thus move) the valve member in the upstream direction (i.e. to open the outlet aperture), e.g. such that the fluid pressure acts on a downstream face of the (e.g. piston head of the) valve member. The other of the control volumes is preferably arranged such that the fluid pressure acts to bias (and thus move) the valve member in the downstream direction (i.e. to close the outlet aperture), e.g. such that the fluid pressure acts on an upstream face of the (e.g. piston head of the) valve member. Thus, in the event of a loss of fluid pressure, the valve member experiences a drop in the pressure acting on both of its sides. The valve member is thus preferably arranged to remain in the position when the loss of fluid pressure occurred.

In this set of embodiments, preferably the device (e.g. the housing and valve member) is arranged such that the downstream pressure of the fluid in the conduit does not act to bias the valve member. Preferably the closure member of the valve member is pressure balanced, e.g. preferably the closure member comprises aperture(s) therethrough. This means that although the closure member may be exposed to the downstream pressure of the fluid in the conduit, this does not cause a net force to act in either the upstream or downstream direction on the valve member.

In these embodiments, the device may comprise a spring, wherein the spring is arranged to act to bias the valve member in either the upstream or the downstream direction. Such an arrangement may therefore be arranged to bias the valve member in the upstream or the downstream direction respectively, e.g. in order to move the valve member into the fully closed or fully open position when there is a loss of fluid pressure in both the control volumes.

In the above embodiments the device may be (and preferably is) operated simply as an on-off valve, e.g. using the control fluid pressure to move the valve member to open or close the outlet aperture. However, it will be appreciated that the fluid pressure may be controlled to move the valve member into a position between its fully open and its fully closed configurations. The device may then be operated as a control valve.

In some embodiments the device is adapted further to help it to control the flow of fluid therethrough with more fine control than simply having the valve member open or closed. In a preferred embodiment the device comprises a cage that extends across the flow path between the housing and the outlet aperture, wherein the cage comprises a plurality of apertures (e.g. holes or slots) to allow fluid to flow through. Preferably the cage is arranged such that movement of the valve member selectively allows fluid to flow through a lesser or greater proportion of the plurality of apertures in the cage. This acts to throttle the flow of fluid through the device (and thus through the outlet aperture), therefore helping to control the flow of fluid through the device.

The cage (e.g. a valve trim) may be provided in any suitable and desired way to control the flow of fluid therethrough according to the movement and position of the valve member. In one embodiment the cage is attached to (and, e.g., projects from) the valve member. Therefore, preferably, as the valve member moves towards and away from the outlet aperture, a lesser or greater (respectively) number of apertures in the cage are exposed to the flow path through the device, thus controlling the flow of fluid through the outlet aperture.

In one embodiment the cage is attached to (and, e.g., extends between) the housing and the downstream casing (e.g. the rim of the outlet aperture). In this embodiment, preferably the valve member moves relative to the cage (e.g. the cage is fixed stationary in the device). Therefore, preferably, as the valve member moves towards and away from the outlet aperture, the apertures in the cage are selectively opened and closed, thus controlling the flow of fluid through the outlet aperture.

The arrangement of (e.g. the size and distribution of) the apertures in the cage may be chosen to provide a particular profile for the control of the flow of fluid through the outlet aperture.

When viewed from a second aspect, the invention provides a device for controlling the flow of fluid through a conduit from an upstream side of the device to a downstream side of the device, the device comprising
- an upstream valve casing defining an inlet on the upstream side of the device;
- a downstream valve casing defining an outlet aperture on the downstream side of the device;
- a valve core secured between the upstream valve casing and the downstream valve casing, wherein the upstream valve casing, the downstream valve casing and the valve core are formed as discrete parts;
- wherein the valve core comprises a housing;
- a valve member movably mounted on the housing and positioned on the upstream side of the outlet aperture, wherein the valve member is arranged to move reciprocally to selectively open and close the outlet aperture, thereby controlling flow of the fluid through the outlet aperture;
- a magnet mounted on or relative to the valve member, wherein the magnet is arranged to be displaced by the displacement of the valve member in a direction parallel to the direction of displacement of the valve member; and
- a magnetic field sensor mounted on the valve housing.

It will be appreciated that this aspect of the invention may (and preferably does) include one or more (e.g. all) of the optional and preferred features outlined herein.

For example, in one set of embodiments, the device may be arranged to determine the position of the valve member, from the output received from the magnetic field sensor, e.g. using a control unit.

Certain preferred embodiments for the invention will now be described, by way of example only, with reference to the accompanying drawings in which.

There are many different industrial situations in which there is a desire to control the flow rate in a fluid flow stream through a conduit. In such systems, a device is required to control the output flow rate by opening and/or closing an outlet (e.g. valve) aperture. As will now be described, embodiments of the present invention provide devices that are able to provide this control for the fluid flow.

Figure 1A:
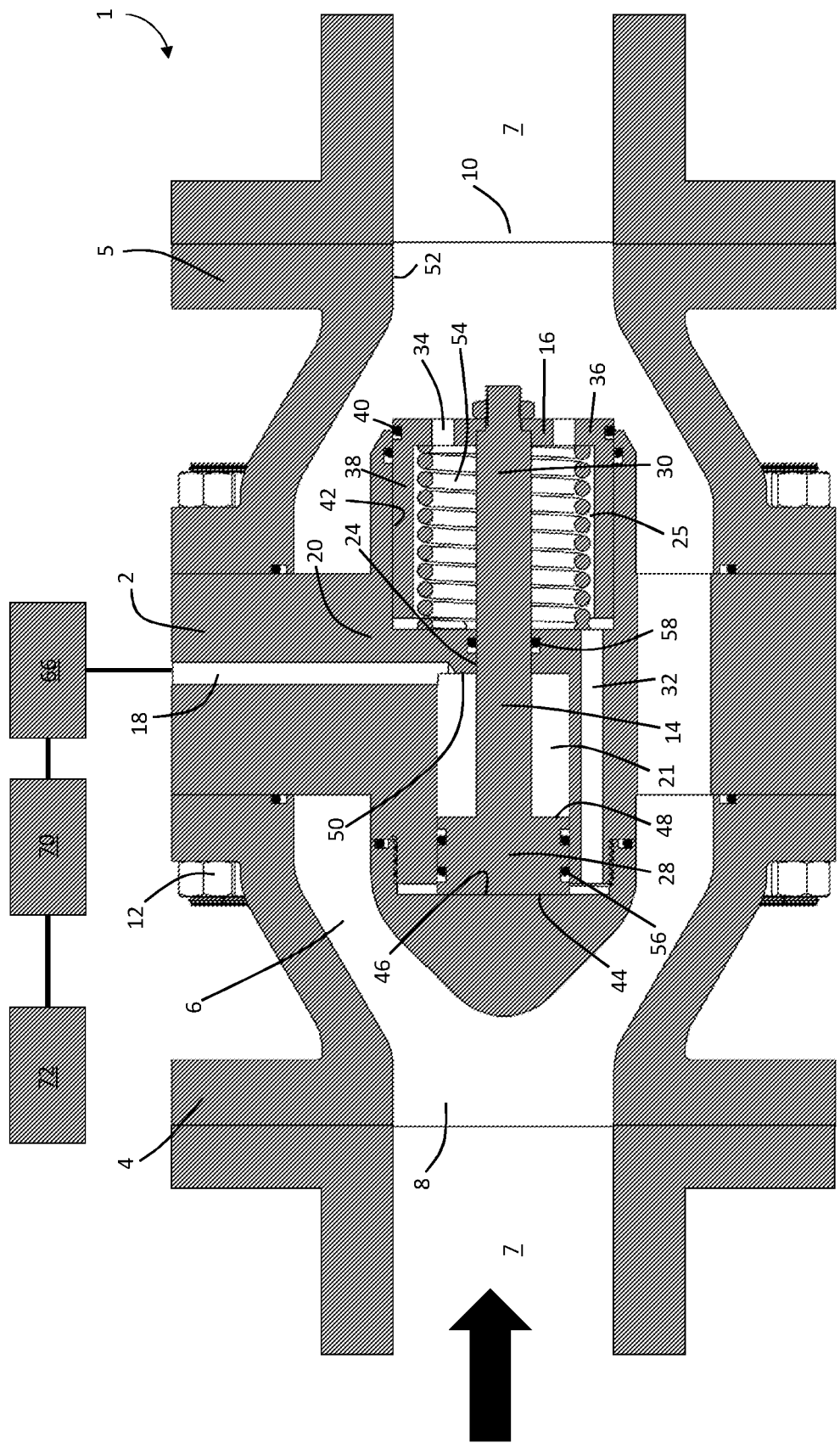
FIGS. 1a and 1b show a cross-sectional view of a device in accordance with an embodiment of the invention wherein the valve member is arranged to close in the event of a failure.
Figure 1B:
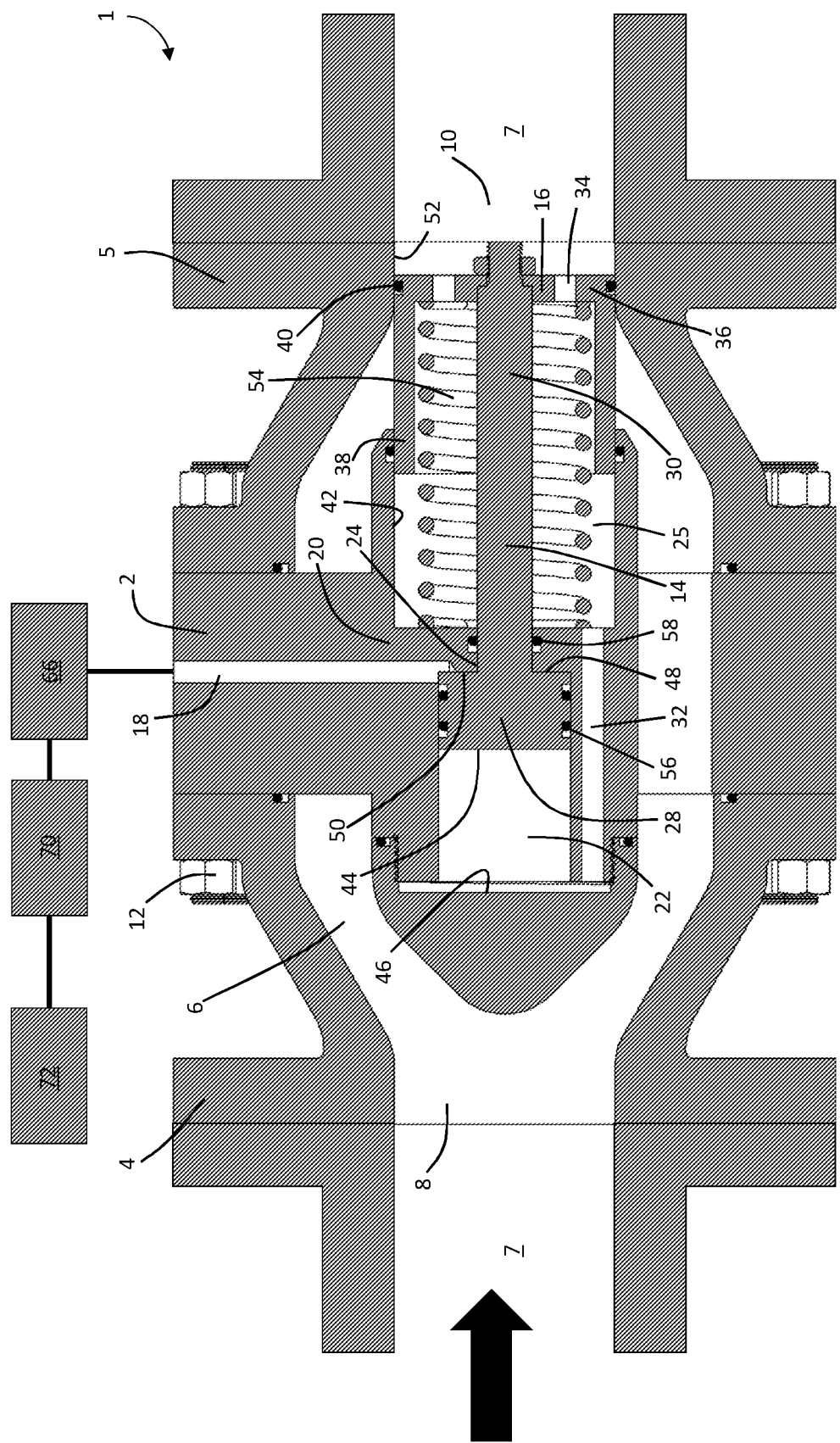

FIGS. 1a and 1b show a cross-sectional view of a fluid flow device 1 in accordance with an embodiment of the present invention. FIG. 1a shows the device 1 in its fully-open position and FIG. 1b shows the device 1 in its fully-closed position. The device 1 comprises a valve core 2, an upstream valve casing 4 and a downstream valve casing 5, which are formed as three separate components. The device 1 is mounted in a pipe 7 that extends either side of the upstream and downstream valve casings 4, 5.

To assemble the device 1, the valve core 2 is mounted and sealed between the upstream and downstream valve casings 4, 5 and is clamped in place by means of a flange bolt circle 12. This provides an advantage over one-piece cast valve bodies, in which the valve member must be smaller in diameter than the ends of the valve in order for it to be inserted through the inlet or outlet aperture. Whereas, with the present three-piece design, it is possible to accommodate a larger valve core and valve member capable of supporting higher hydraulic control pressures.

The upstream valve casing 4 defines an inlet aperture 8 and the downstream valve casing 5 comprises a valve seat 52 surrounding and defining an outlet aperture 10. The flow of fluid in FIGS. 1a and 1b is from left to right, following a conduit 6 defined within the valve casings 4, 5.

The valve core 2 comprises four main components: a piston 14, a closure member 16, a control fluid feed 18 and a housing 20. The piston 14 and the closure member 16 together form a valve member. The housing 20 and the piston 14 together define a control fluid pressure chamber 21 and a downstream pressure chamber 22.

The control fluid pressure chamber 21 is downstream of the piston head 28 and is fluidly connected to the control fluid feed 18 for supplying a control fluid (and thus a control fluid pressure) into the control fluid pressure chamber 21, such that the control fluid pressure acts on the downstream face 48 of the piston head 28. The downstream pressure chamber 22 is upstream of the piston head 28 and is fluidly connected to the downstream side of the conduit 6 via an upstream piston cavity balance hole 32 and closure member balance holes 34. This allows the fluid on the downstream side of the conduit 6 (and thus a downstream fluid pressure) to be supplied into the downstream pressure chamber 22 (via the upstream piston cavity balance hole 32 and the closure member balance holes 34), such that the pressure in the upstream portion of the downstream pressure chamber 22 (and thus acting on the upstream face of the piston head 28) is equal to the downstream pressure at the outlet aperture 10.

The housing 20 further defines a piston shaft aperture 24 and a closure member chamber 25.

The control fluid feed 18 is connected to a source of control fluid 66 (e.g. hydraulic fluid, pneumatic fluid or fluid taken from within the pipe 7) which is controlled by a control system 70, e.g. to set the pressure of the control fluid in the control fluid pressure chamber 21. The control system 70 may use feedback data collected by a position sensor 72 that determines the position of the piston 14 relative to the housing 20 and/or the outlet aperture 10.

The piston 14 comprises a piston head 28 and a piston shaft 30, which projects perpendicularly from the downstream surface 48 of the piston head 28 through the piston shaft aperture 24 into the closure member chamber 25. The piston head 28 is sealed against the housing 20 by piston seals 56 and the piston shaft 30 is sealed within the piston shaft aperture 24 by piston shaft seals 58. This prevents the control fluid from leaking into the downstream pressure chamber 22 and the closure member chamber 25 respectively.

The closure member 16 is attached to the downstream end of the piston shaft 30 such that the closure member 16 moves longitudinally with the piston 14. The closure member 16 has a cylindrical sleeve portion 38 and an end portion 36. The end portion 36 comprises shut off seals 40, mounted on the outside surface of the closure member end portion 36, and a number of closure member balance holes 34 that allow fluid to pass from the downstream side of the conduit 6 through the closure member chamber 25 and into the downstream pressure chamber 22 via the upstream piston cavity balance hole 32. The closure member 16 is arranged to move reciprocally along the inner surface 42 of the housing 20 within the closure member chamber 25.

The cylindrical sleeve portion 38 of the closure member 16 has a hollow central bore in which a helical spring 54 is positioned around the piston shaft 30. The helical spring 54 is a compression spring which is held between the housing 20 and the closure member 16 to bias the closure member 16 to close the outlet aperture 10.

The closure member 16 is moveable between two extreme positions: a fully-open position, as shown in FIG. 1a, and a fully-closed position, as shown in FIG. 1b. In the fully-open position, the upstream surface 44 of the piston head 28 abuts the upstream inner face 46 of the housing 20 and the end portion 36 of the closure member 16 is located within the closure member chamber 25, leaving a flow path for the flow of fluid through the outlet aperture 10 from the upstream side of the device 1 to the downstream side. In the fully-closed position, the downstream surface 48 of the piston head 28 abuts the downstream inner surface 50 of the housing 20 and the end portion 36 of the closure member 16 is moved such that the outer surface of the end portion 36 of the closure member 16 is sealed against the valve seat 52 by shut off seals 40. This prevents the fluid from flowing through device 1 via the outlet aperture 10.

Operation of the fluid flow device 1 shown in FIGS. 1a and 1b will now be described.

FIG. 1b shows the device 1 in its fully-closed state, in which the control fluid pressure in the control fluid pressure chamber 21 is set to a low value by the control fluid source 66 (controlled by the control system 70). The combined force from the downstream pressure acting on the upstream surface 44 of the piston head 28 and the spring force from the helical spring 54 is greater than the control fluid pressure acting on the downstream surface 48 of the piston head 28. Thus the piston 14 is moved to the right of FIG. 1b, moving the end portion 36 of the closure member 16 to be sealed against the valve seat 52 by the shut off seals 40. This prevents the fluid from flowing through the device 1 via the outlet aperture 10.

In order to place the device 1 in the fully-open position, as shown in FIG. 1a, the control fluid pressure is raised to a value sufficient to cause the force acting on the downstream surface 48 of the piston head 28 to be greater than the combined opposing forces caused by the helical spring 54 and the downstream pressure acting on the upstream surface 44 of the piston head 28. As a result, the upstream surface 44 of the piston head 28 is moved to the position in which it abuts the upstream inner surface 46 of the housing 20, thus moving the closure member 16 to be located within the closure member chamber 25, leaving a flow path for the flow of fluid through the outlet aperture 10.

In the event of failure of one or more of the piston seals 56 or piston shaft seals 58, causing the pressure acting on the upstream surface 44 of the piston head 28 to become equal to the pressure acting on the downstream surface 48 of the piston head 28, the helical spring 54 acts to bias the closure member 16 to the right of FIGS. 1a and 1b into the fully-closed position. In the event of a loss of control fluid pressure (e.g. owing to a loss of power in the hydraulic and/or control systems 70), the downstream pressure acting on the upstream surface 44 of the piston head 28 is greater than the control pressure acting on the downstream surface 48 of the piston head 28. Furthermore, the helical spring 54 acts to bias the closure member 16 towards the right of FIG. 1b. Thus, in both of these failure modes of the fluid flow device 1, the piston 14 is moved to the right of FIG. 1b, moving the end portion 36 of the closure member 16 to be sealed against the valve seat 52 by the shut off seals 40. This prevents the fluid from flowing through device 1 via the outlet aperture 10, thus representing a "fail closed" mode of the device.

Figure 2A:
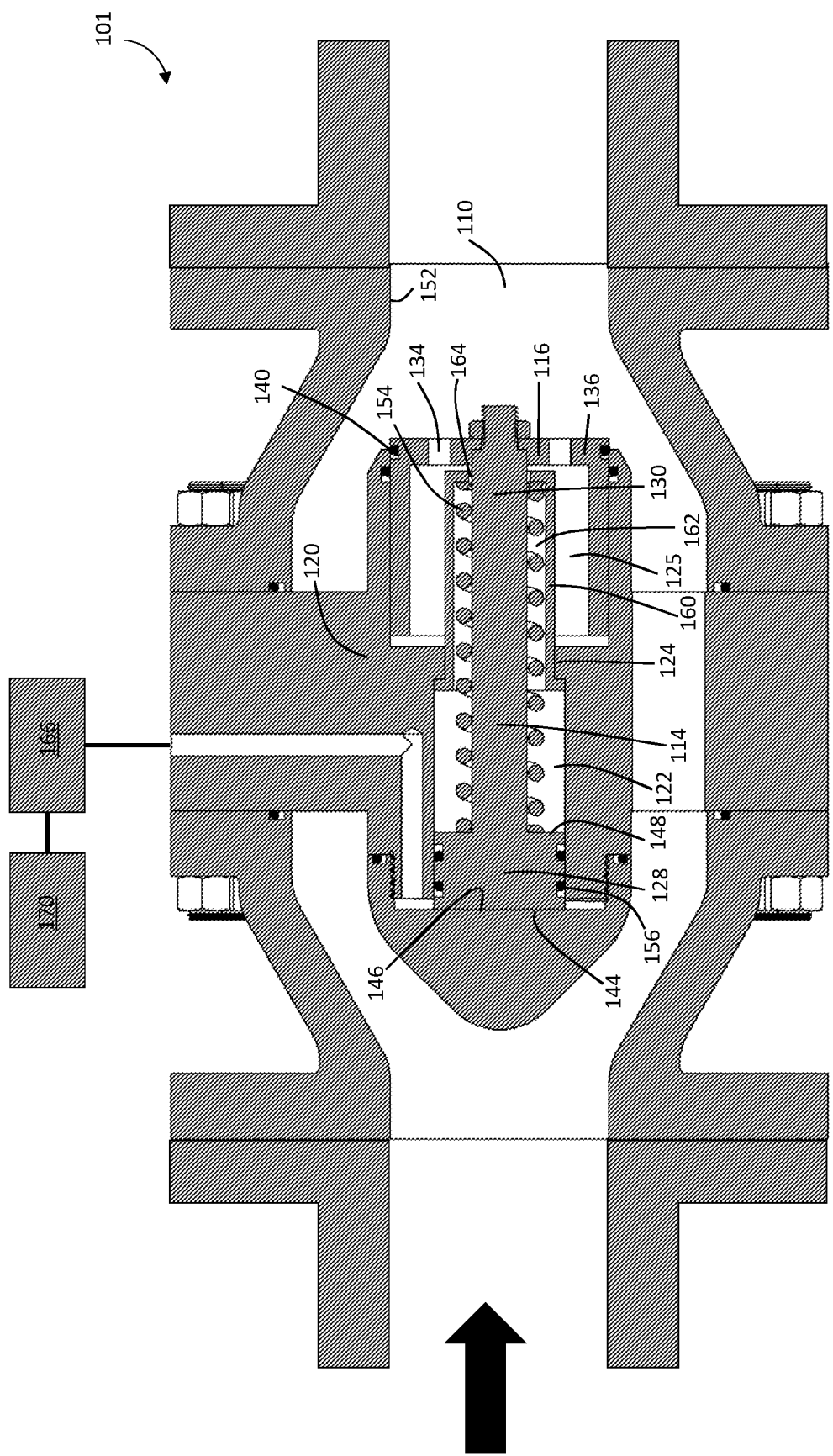
FIGS. 2a and 2b show a cross-sectional view of a device in accordance with an embodiment of the invention wherein the valve member is arranged to open in the event of a failure.
Figure 2B:
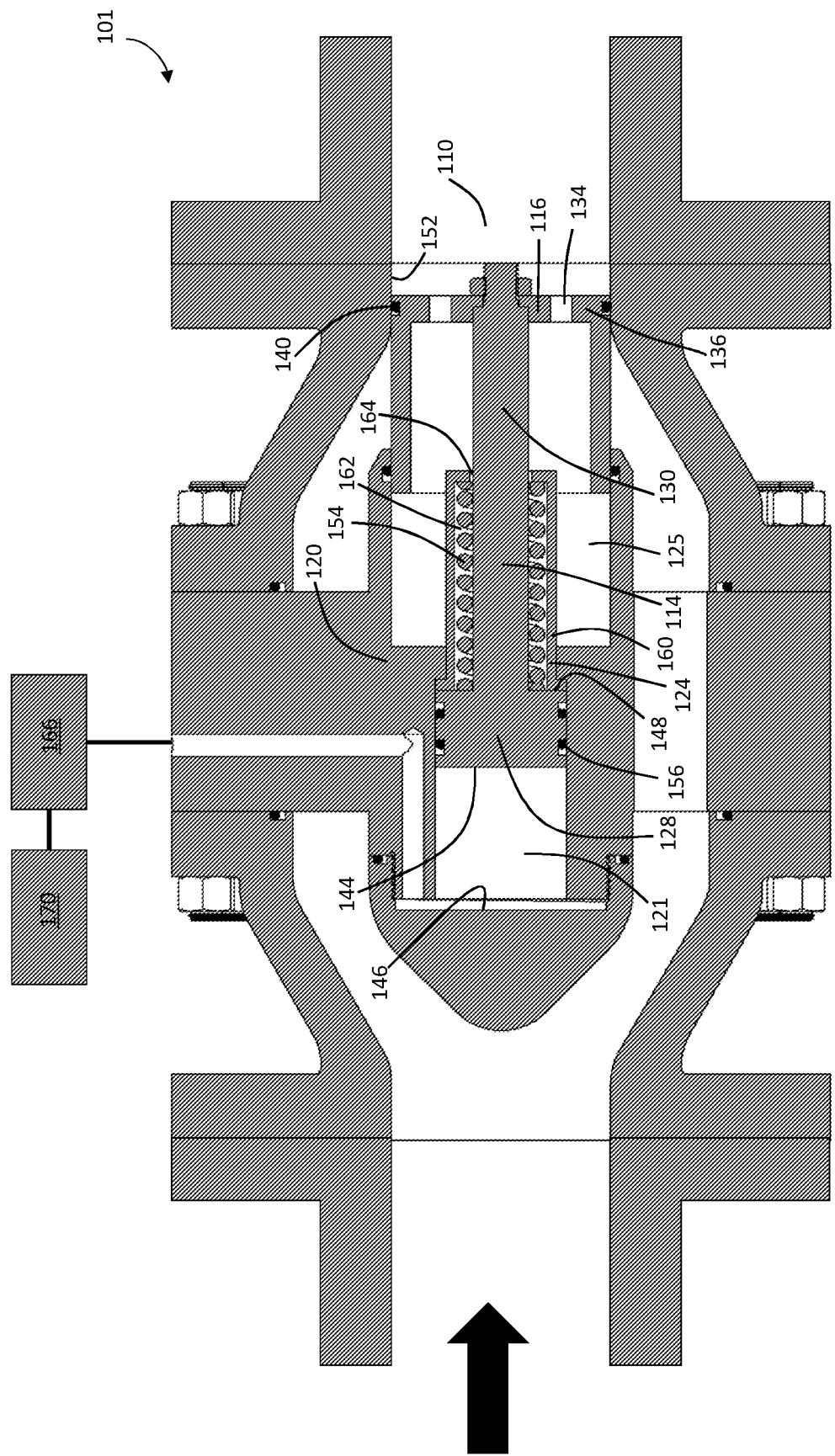

FIGS. 2a and 2b show a device 101 in accordance with a further embodiment of the present invention, which is a variant of the device 1 shown in FIGS. 1a and 1b. FIG. 2a shows the device 101 in its fully-open position and FIG. 2b shows the device 101 in its fully-closed position.

The embodiment has the same three-piece design as the embodiment shown in FIGS. 1a and 1b. However, the device 101 varies from device 1 in a number of ways.

First, the control fluid pressure chamber 121 is on the upstream side of the piston head 128 and the downstream pressure chamber 122 is on the downstream side of the piston head 128. The downstream pressure chamber 122 in the device 101 is defined by the housing 120, the downstream surface 148 of the piston head 128 and the inner surface of a cylindrical spring housing 160. The spring housing 160 extends through the piston shaft aperture 124 from the piston chamber 122 to the closure member chamber 125.

The spring housing 160 comprises a central bore 162 and an end aperture 164, wherein the end aperture 164 is proportioned to accommodate the piston shaft 130. A helical spring 154 is positioned within the central bore 162 such that it encompasses the piston shaft 130 and extends between the downstream surface 148 of the piston head 128 and the downstream inner surface of the spring housing 160. The helical sprint 154 thus acts to bias the closure member 116 to open the outlet aperture 110.

Second, the housing 120 of device 101 does not define an upstream cavity balance hole. Instead, the downstream pressure chamber 122 is fluidly connected to the outlet aperture 110 via the end aperture 164 of the spring housing 160 and the closure member balance holes 134. The downstream pressure thus acts on the downstream face 148 of the piston head 128.

Operation of the fluid flow device 101 shown in FIGS. 2a and 2b will now be described.

FIG. 2a shows the device 101 in its fully-open state, in which the control fluid pressure in the control fluid pressure chamber 121 is set to a low value by the hydraulic source 166 (controlled by the control system 170). The combined force from the downstream pressure acting on the downstream surface 148 of the piston head 128 and the spring force from the helical spring 154 is greater than the control fluid pressure acting on the upstream surface 144 of the piston head 128. As a result, the upstream surface 144 of the piston head 128 is moved to the position in which it abuts the upstream inner surface 146 of the housing 120, thus moving the end portion 136 of the closure member 116 to be located within the closure member chamber 125, leaving a flow path for the flow of fluid through the outlet aperture 110. It will be appreciated that this arrangement is the reverse of the arrangement shown in FIG. 1a and described above, where the device 1 is designed to fully close when the control fluid pressure is low.

In order to place the device 101 in the fully-closed position, as shown in FIG. 2b, the control fluid pressure is raised to a value sufficient to cause the force acting on the upstream surface 144 of the piston head 128 to be greater than the combined opposing forces caused by the helical spring 154 and the downstream pressure acting on the downstream surface 148 of the piston head 128. As a result, the piston 114 is moved to the right of FIG. 2b, moving the end portion 136 of the closure member 116 to be sealed against the valve seat 152 by the shut off seals 140. This prevents the fluid from flowing through the device 101 via the outlet aperture 110.

In the event of failure of one or more of the piston seals 156, causing the pressure acting on the downstream surface 148 of the piston head 128 to become equal to the pressure acting on the upstream surface 144 of the piston head 128, the helical spring 154 acts to bias the closure member 116 to the left of FIGS. 2a and 2b into the fully-open position. In the event of a loss of control fluid pressure (e.g. owing to a loss of power in the hydraulic and/or control systems 170), the downstream pressure acting on the downstream surface 148 of the piston head 128 is greater than the control pressure acting on the upstream surface 144 of the piston head 128. Furthermore, the helical spring 154 acts to bias the closure member 116 towards the left of FIG. 2b. Thus, in both of these failure modes of the fluid flow device 101, the piston 114 is moved to the left of FIG. 2b, moving the end portion 136 of the closure member 116 to be located within the closure member chamber 125, leaving a flow path for the flow of fluid through the outlet aperture 110, thus representing a "fail open" mode of the device.

Figure 3A:
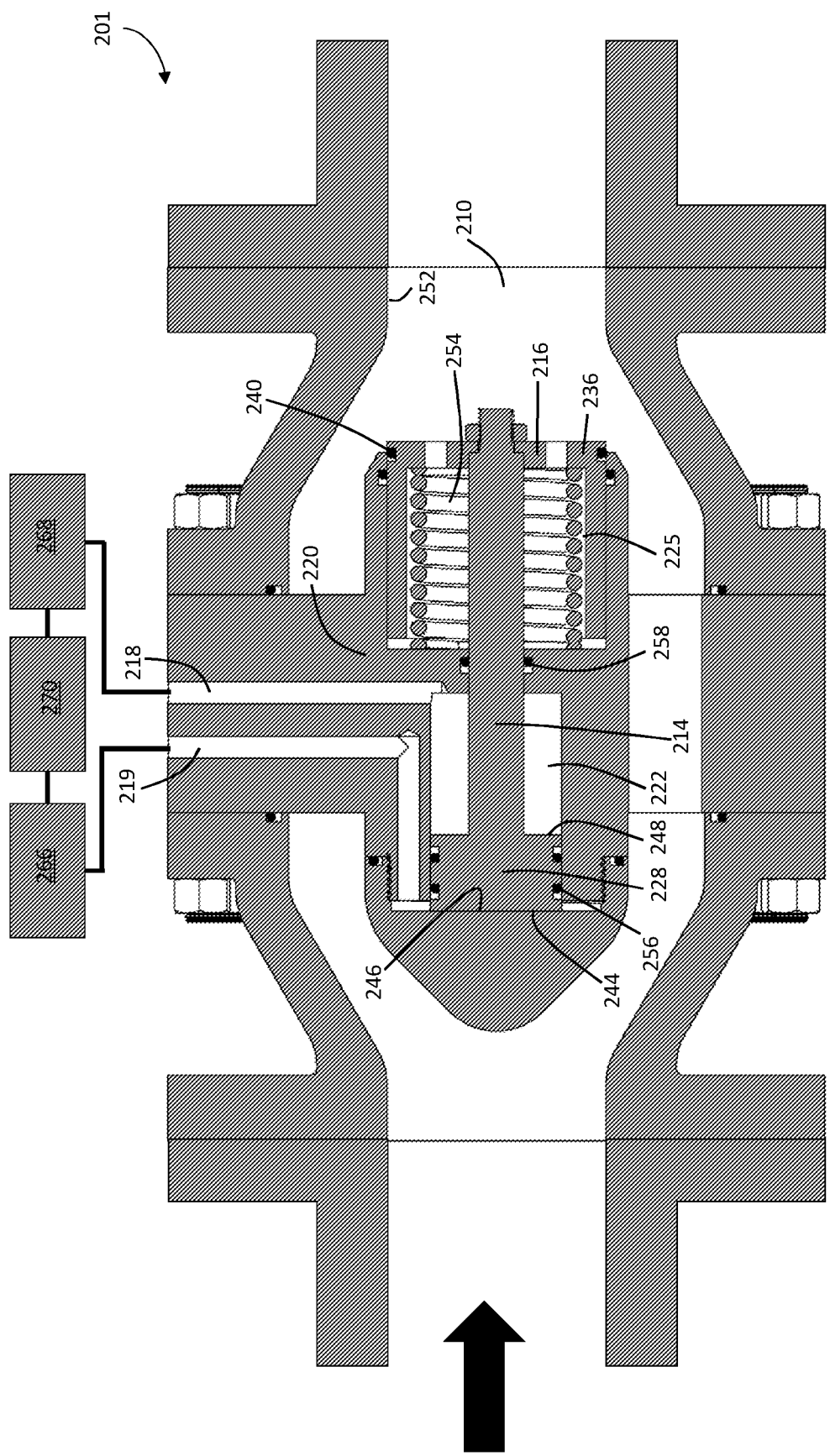
FIGS. 3a and 3b show a cross-sectional view of a device in accordance with an embodiment of the invention wherein the valve member is actuated open or closed by separate control fluid feeds.
Figure 3B:
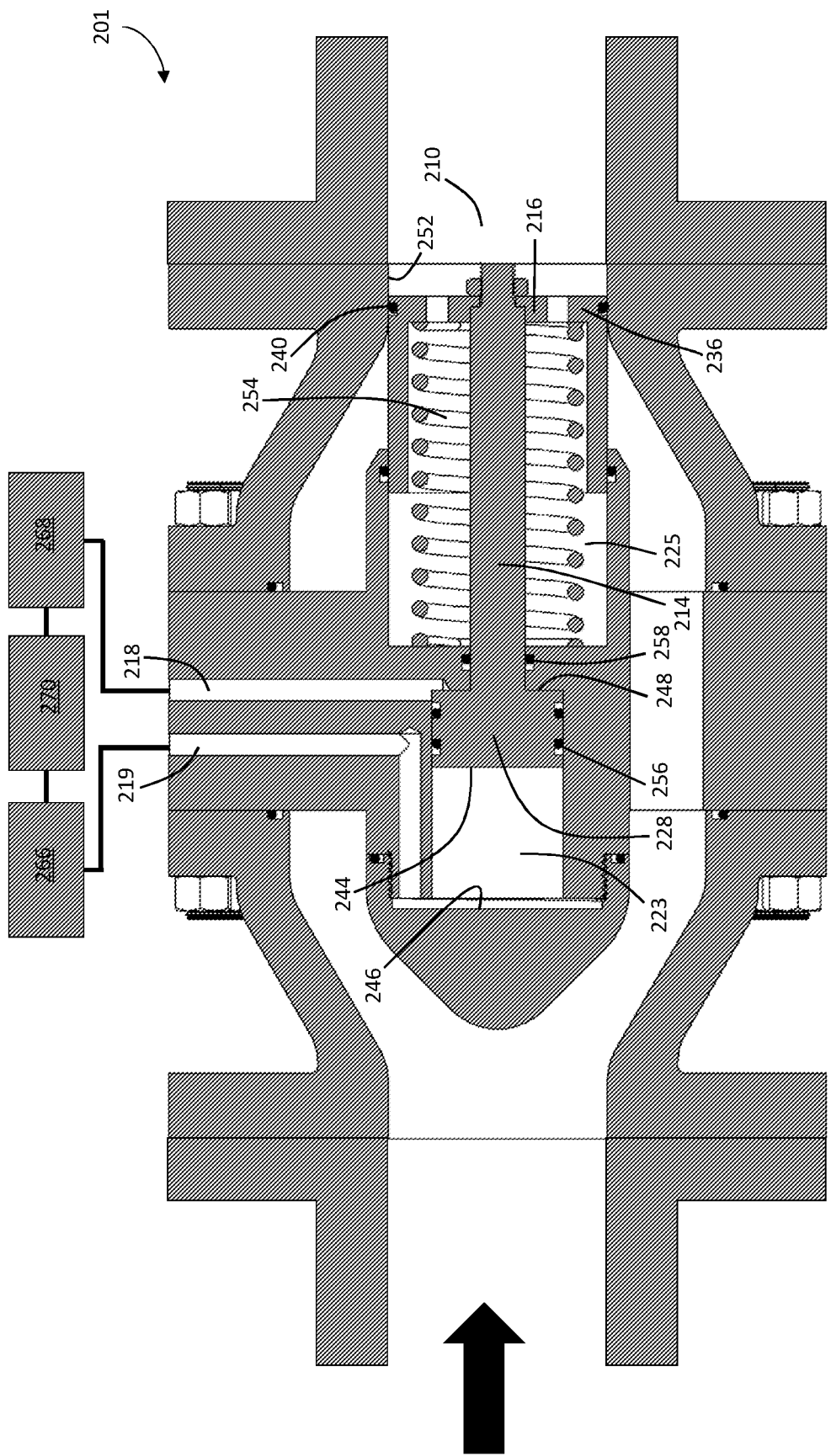

FIGS. 3a and 3b show a device 201 in accordance with a further embodiment of the present invention, which is a variant of the device 1 shown in FIGS. 1a and 1b. FIG. 3a shows the device 201 in its fully-open position and FIG. 3b shows the device 201 in its fully-closed position.

The embodiment has the same three-piece design as the embodiment shown in FIGS. 1a and 1b. However, the device 201 varies from device 1 in a number of ways.

The housing 220 of device 201 defines two control fluid pressure chambers: an upstream control fluid pressure chamber 223, located upstream of the piston head 228 and a downstream control fluid pressure chamber 222, located downstream of the piston head 228. The upstream control fluid pressure chamber 223 is fluidly connected to an upstream control fluid source 266 via an upstream control fluid feed 219 for supplying a control fluid (and thus a control fluid pressure) into the upstream control fluid pressure chamber 223, such that the control fluid pressure acts on the upstream face of the piston head 228. The downstream control fluid pressure chamber 222 is fluidly connected to a downstream control fluid source 268 via a downstream control fluid feed 218 for supplying a control fluid (and thus a control fluid pressure) into the downstream control fluid pressure chamber 222, such that the control fluid pressure acts on the downstream face of the piston head 228.

Operation of the fluid flow device 201 shown in FIGS. 3a and 3b will now be described.

FIG. 3b shows the device 201 in its fully-closed state, in which the control fluid pressure in the downstream control fluid pressure chamber 222 is set to a low value by a downstream control fluid source 268 and the control fluid pressure in the upstream control fluid pressure chamber 223 is set to a high value by an upstream control fluid source 266. Both the downstream control fluid source 268 and the upstream control fluid source 266 are controlled by a control system 270.

The combined force from the control pressure acting on the upstream surface 244 of the piston head 228 and the spring force from the helical spring 254 (which acts to bias the closure member 216 towards the right of FIG. 3b) is greater than the control pressure acting on the downstream surface 248 of the piston head 228. Thus the piston 214 is moved to the right of FIG. 3b, moving the end portion 236 of the closure member 216 to be sealed against the valve seat 252 by the shut off seals 240. This prevents the fluid from flowing through the device 201 via the outlet aperture 210.

In order to place the valve 201 in the fully-open position, as shown in FIG. 3a, the downstream control fluid pressure is raised by the control system 270 to a value sufficient to cause the force acting on the downstream surface 248 of the piston head 228 to be greater than the combined opposing forces caused by the helical spring 254 and the downstream control pressure acting on the upstream surface 244 of the piston head 228. As a result, the upstream surface 244 of the piston head 228 is moved to a position in which it abuts the upstream inner surface 246 of the housing 220, thus moving the closure member 216 to be located within the closure member chamber 225, leaving a flow path for the flow of fluid through the outlet aperture 210.

In the event of failure of one or more of the piston seals 256, causing the pressures in the downstream control fluid pressure chamber 222 and the upstream control fluid pressure chamber 223 to equalise, the helical spring 254 acts to bias the closure member 216 to the right of FIGS. 3a and 3b into the fully-closed position. In a further failure mode, when one or more of the piston shaft seals 258 fail, the downstream control fluid pressure becomes equal to the downstream pressure. In this case, the helical spring 254 acts to bias the closure member 216 to the right of FIGS. 3a and 3b and move it in into the fully-closed position.

In the event of a loss of downstream control fluid pressure (e.g. owing to a loss of power in the hydraulic and/or control systems 270), the piston head 228 is biased and moved towards the right of FIGS. 3a and 3b by the combined force of the helical spring 254 and the upstream control pressure.

Thus, in all of the failure modes of the fluid flow device 201 described above, the piston 214 is forced to the right of FIG. 3b, moving the end portion 236 of the closure member 216 to be sealed against the valve seat 252 by the shut off seals 240. This prevents the fluid from flowing through the device 201 via the outlet aperture 210. However, it will be appreciated that the helical spring 254 of device 201 shown in FIGS. 3a and 3b may be adapted to function in a manner similar to that shown in FIGS. 2a and 2b so that the device operates as a "fail-open" device. Furthermore, the helical spring 254 may be removed completely so that, in the event of seal or power failure, the valve 201 is designed to fail "in-place", i.e. the valve 201 is not biased to either the fully-closed or the fully-open position.

Figure 4:
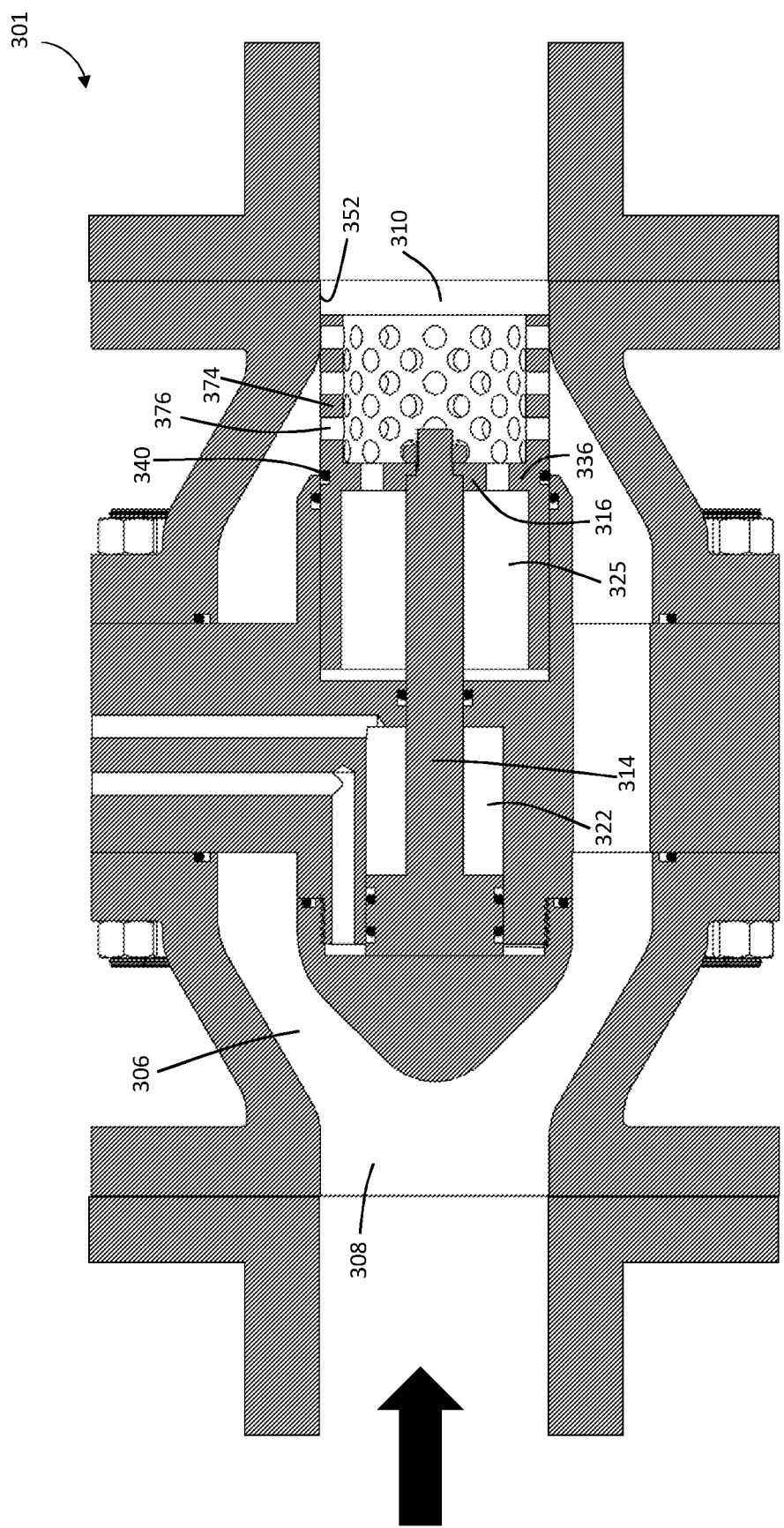
FIG. 4 shows a cross-sectional view of a device in accordance with an embodiment of the invention wherein a cage trim is attached to the valve member.

FIG. 4 shows a device 301 in accordance with a further embodiment of the present invention, which is a variant of the device 201 shown in FIGS. 3a and 3b. The device 301 is essentially the same as the device 201 discussed above. However, the helical spring 254 has been removed and a cylindrical cage 374 has been centrally attached to the end portion 336 of the closure member 316. The embodiment has the same three-piece design as the embodiment shown in FIGS. 3a and 3b.

The cylindrical cage 374 extends longitudinally through the outlet aperture 310 of the device 301. The outer diameter of the cage 374 is equal to the outer diameter of the end portion 336 of the closure member 316 so that the cage 374 fills the outlet aperture 310. The cage 374 comprises a plurality of apertures 376 which are distributed uniformly along the length and circumference of the cage 374 and fluidly connect inlet aperture 308 of the conduit 306 to the outlet aperture 310.

As in previous embodiments, the closure member 316 is moveable longitudinally within the closure member chamber 325 between a fully-open position (shown in FIG. 4) and a fully-closed position (not shown).

FIG. 4 shows the device 301 in its fully-open position, in which the downstream control fluid pressure in the downstream control fluid pressure chamber 322 is greater than the upstream control fluid pressure in the upstream control fluid pressure chamber 323. As a result, the piston 314, the closure member 316 and the cage 374 are moved to the left of FIG. 4 such that the closure member 316 is fully located within the closure member chamber 325. In this position, a maximum number of cage apertures 376 are opened to allow fluid to flow through the device 301 at a maximum flow rate.

In order to reduce the flow rate through the device 301, the upstream control pressure is increased, causing the piston 314, closure member 316 and the cage 374 to move to the right of FIG. 4. As the cage 374 is moved into the outlet aperture 310, the number of cage apertures 376 that are closed by the valve seat 352 increases. This has the effect of throttling the fluid flow, as the flow rate will decrease in proportion the total area of the apertures 376 that remain open. Consequently, it will be appreciated that this embodiment enables more precise control of the fluid flow rate.

When the device 301 reaches its fully-closed position, the end portion 336 of the closure member 316 is sealed against the valve seat 352 by the shut off seals 340 and the cage 374 is fully encompassed by the valve seat 352, thus closing all off the cage apertures 376. This prevents the fluid from flowing through the device 301 via the outlet aperture 310.

Figure 5:
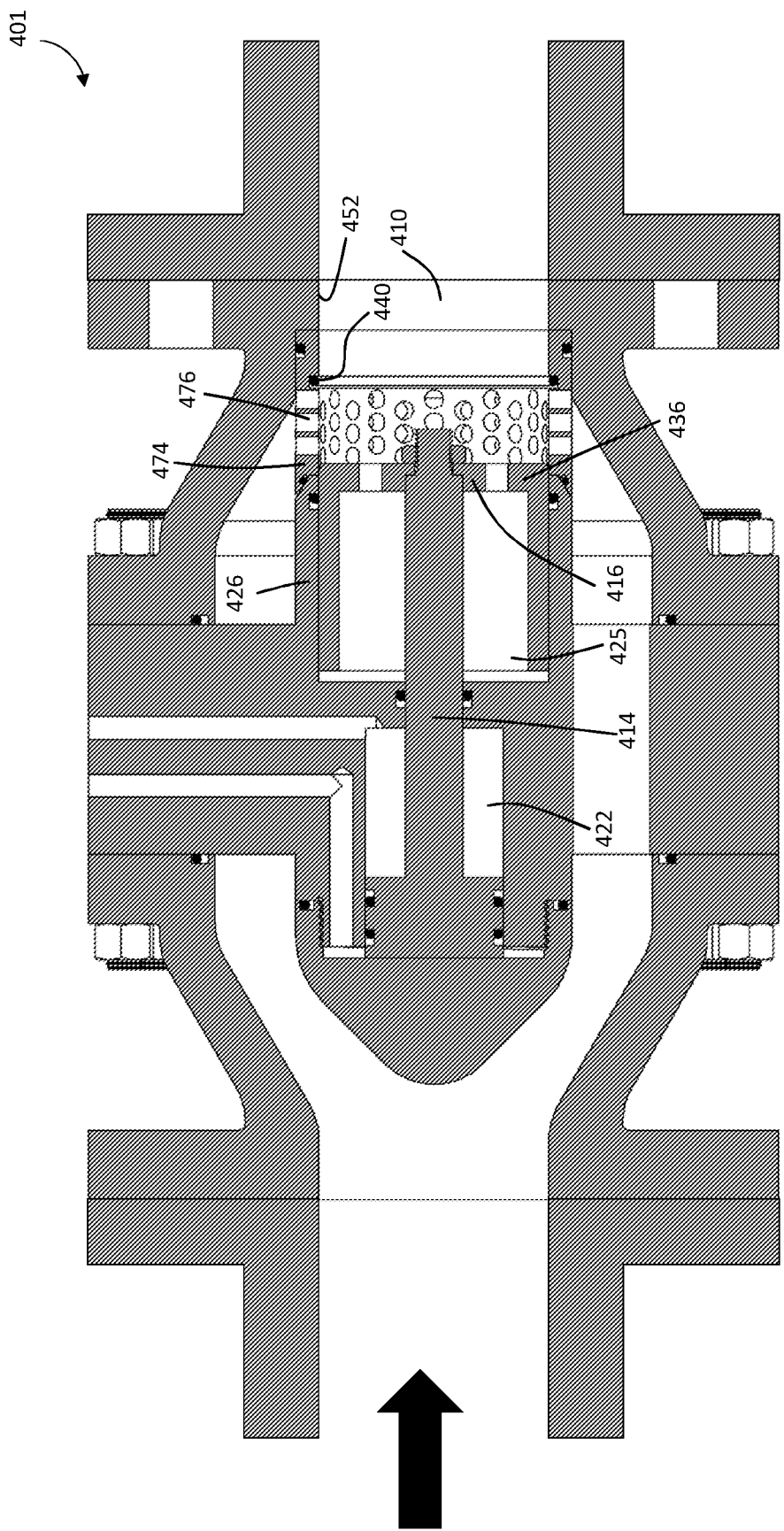
FIG. 5 shows a cross-sectional view of a device in accordance with an embodiment of the invention wherein a cage trim is installed around the valve member.

FIG. 5 shows a device 401 in accordance with a further embodiment of the present invention, which is a variant of the device 301 shown in FIG. 4. The device 401 is essentially the same as the device 301 discussed above. However, rather than the cage 374 being attached to the end portion 336 of the closure member 316, the cage 474 is attached to the downstream end of the closure member casing 426, spanning the orifice between the closure member casing 426 and the valve seat 452. The inner diameter of the cage 474 is equal to the inner diameter of the closure member casing 426 so that the closure member 416 is able to slide longitudinally within the cage 474. Furthermore, the shut off seals 440 are mounted on the inner surface of the valve seat 452 rather than on the outside surface of the closure member 416.

FIG. 5 shows the device 401 in its fully-open position, in which the downstream control fluid pressure in the downstream control fluid pressure chamber 422 is greater than the upstream control fluid pressure in the upstream control fluid pressure chamber 434. As a result, the piston 414 and the closure member 416 are moved to the left of FIG. 5 such that the closure member 416 is fully located within the closure member chamber 425. In this position, none of the cage apertures 476 are closed by the closure member 416. Therefore, fluid may flow through the device 401 at a maximum flow rate.

In order to reduce the flow rate through the device 401, the upstream control pressure is increased, causing the piston 414 and the control member 416 to move to the right of FIG. 5. As the closure member 416 is moved towards the outlet aperture 410, the number of cage apertures 476 that are closed by the closure member 416 increases. This has the effect of throttling the fluid flow, as the flow rate will decrease in proportion to the total area of the apertures 476 that remain open. Consequently, it will be appreciated that this embodiment enables more precise control of the fluid flow rate.

When the device 401 reaches its fully-closed position, the end portion 436 of the closure member 416 is sealed against the valve seat 452 by the shut off seals 440 and all of the cage apertures 476 are completely closed by the closure member 416. This prevents the fluid from flowing through the device 401 via the outlet aperture 410.

Figure 6:
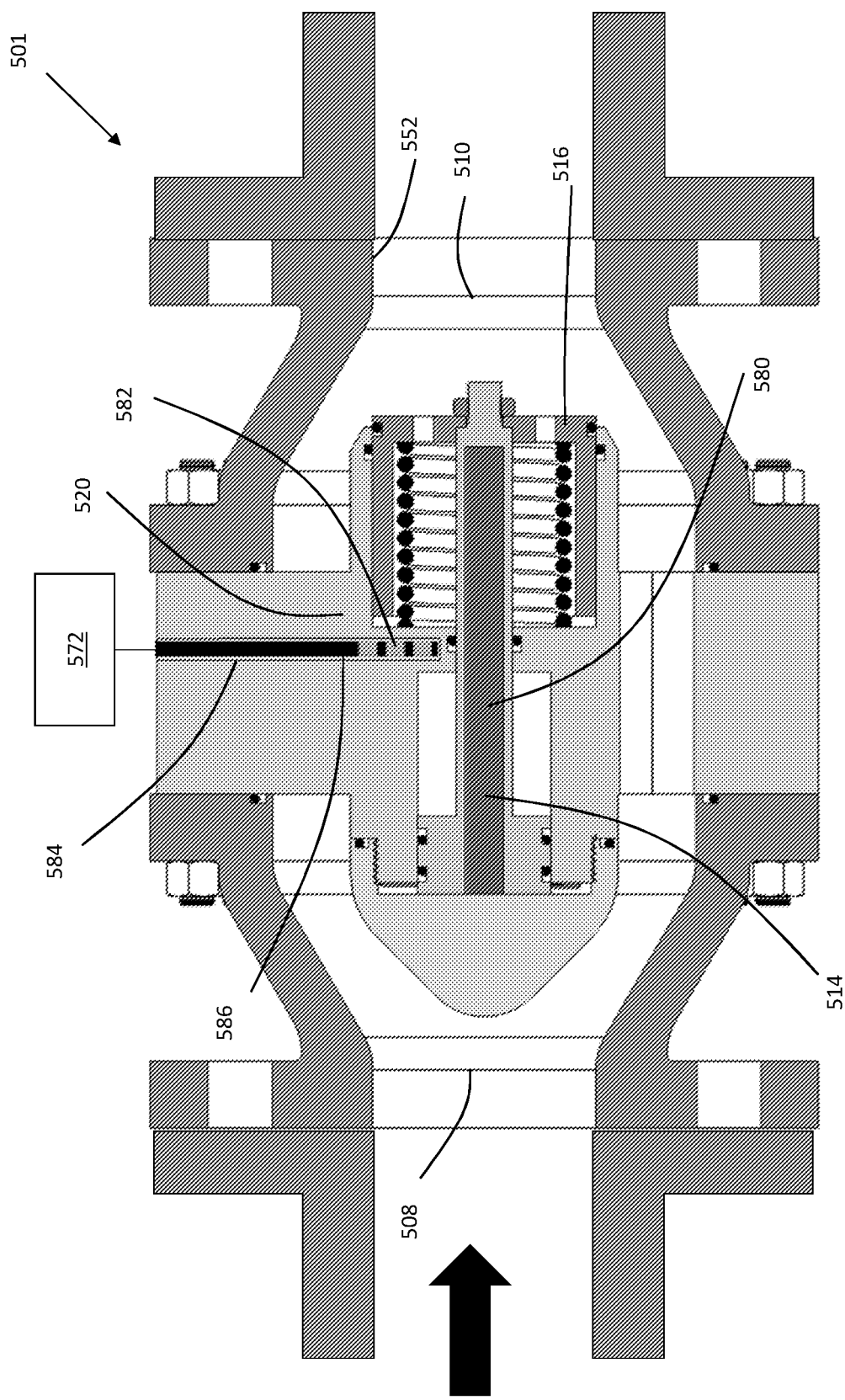
FIG. 6 shows a cross-sectional view of a device in accordance with an embodiment of the invention wherein the device includes a position sensor comprising a magnet and magnetic field sensors.

FIG. 6 shows a cross-sectional view of a fluid flow device 501 in accordance with an embodiment of the present invention, in which the device 501 comprises position sensing apparatus. The device 501 shown in FIG. 6 is substantially the same as the device 1 shown in FIG. 1a, except that the device 501 comprises a magnet 580 embedded within the piston 514 and a magnetic field sensor 582 mounted within a radial hole 584 in the housing 520.

The radial hole 584 extends into the valve core 502 from the exterior surface of the valve core 502. The radial hole 584 is arranged in a plane perpendicular to the control fluid feed and the piston cavity balance hole (not shown). A PCB 586 is located within the radial hole 584 and comprises three magnetic field sensors (Hall effect sensors) 582. Electric cables fed through radial hole 584 provide power to the PCB 586 and allow measurements of the magnetic field strength to be sent from each of the sensors 582 to a position sensor control unit 572.

The magnet 580, extending in the axial direction, is embedded centrally within the piston 514. As the magnet 580 is rigidly embedded within the piston 514, the axial displacement of the piston 514 corresponds exactly to the axial displacement of the magnet 580. As the magnet 580 is located centrally within the piston 514, any circumferential movement of the valve member does not cause a change in distance between the magnet 514 and the sensors 582.

During normal operation of the device 501, the flow of fluid through the device 501 from the inlet aperture 508 to the outlet aperture 510 is controlled by the movement of the piston 514 and closure member 516. As the closure member 516 is moved towards the valve seat 552, the flow through the device 501 is restricted. Therefore, the fluid flow may be throttled by adjusting the axial displacement of the piston 514 and closure member 516.

The sensors 582 continuously measure the strength of the magnetic field of the magnet 580 as it moves with the piston 514 and closure member 516. The measurements may be processed by the position sensor control unit 572 using an error minimisation algorithm in order to determine the axial position of the piston 516 and closure member 516.

Figure 7:
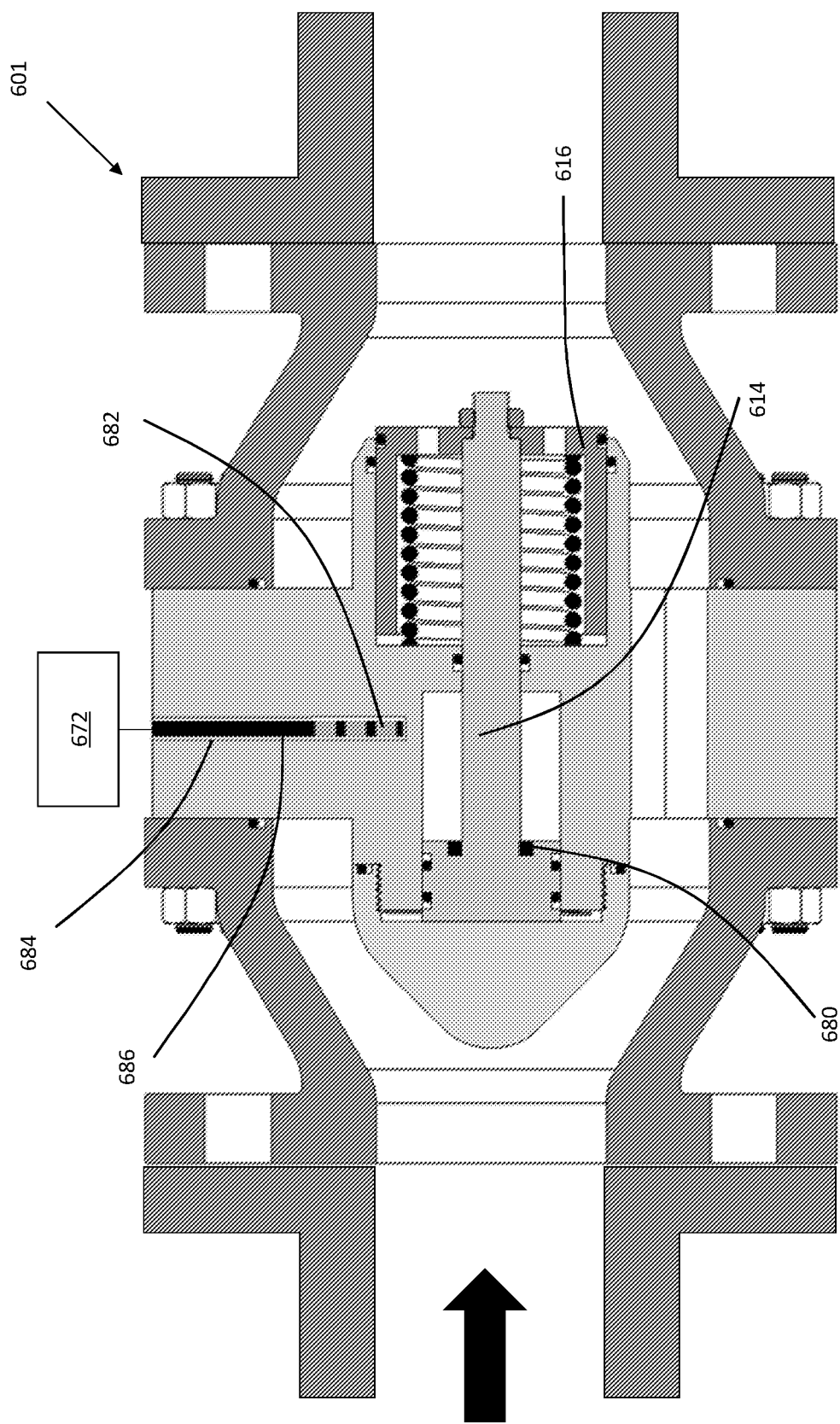
FIG. 7 shows a cross-sectional view of a device in accordance with an embodiment of the invention wherein the device includes a position sensor comprising a ring magnet and magnetic field sensors.

FIG. 7 shows a cross-sectional view of a fluid flow device 601 in accordance with an embodiment of the present invention, in which the device 601 comprises position sensing apparatus. The device 601 is essentially the same as the device 501 discussed above. However, the axial magnet 580 has been replaced by a ring magnet 680 that is embedded within the piston 614.

A PCB 686 comprising three Hall effect sensors 682, electrically connected to the position sensor control unit 672, is located within a radial hole 684. The magnet 680 is positioned with the piston 614 such that, at all axial positions of the piston 614, the sensors 682 are positioned within the end limits of the magnet 680.

Furthermore, as the ring magnet 680 is embedded centrally within the piston 614, any circumferential movement of the closure member 616 does not cause a change in distance between the magnet 680 and the sensors 682.

During normal operation of the device 601, flow through the device 601 is throttled by the axial displacement of the piston 614 and closure member 616. The sensors 682 continuously measure the strength of the magnetic field of the ring magnet 680 as it moves with the piston 614 and closure member 616. In the same way as the above embodiment, the measurements may be processed by the position sensor control unit 672 using an error minimisation algorithm in order to determine the axial position of the piston 614 and closure member 616.

Figure 8:
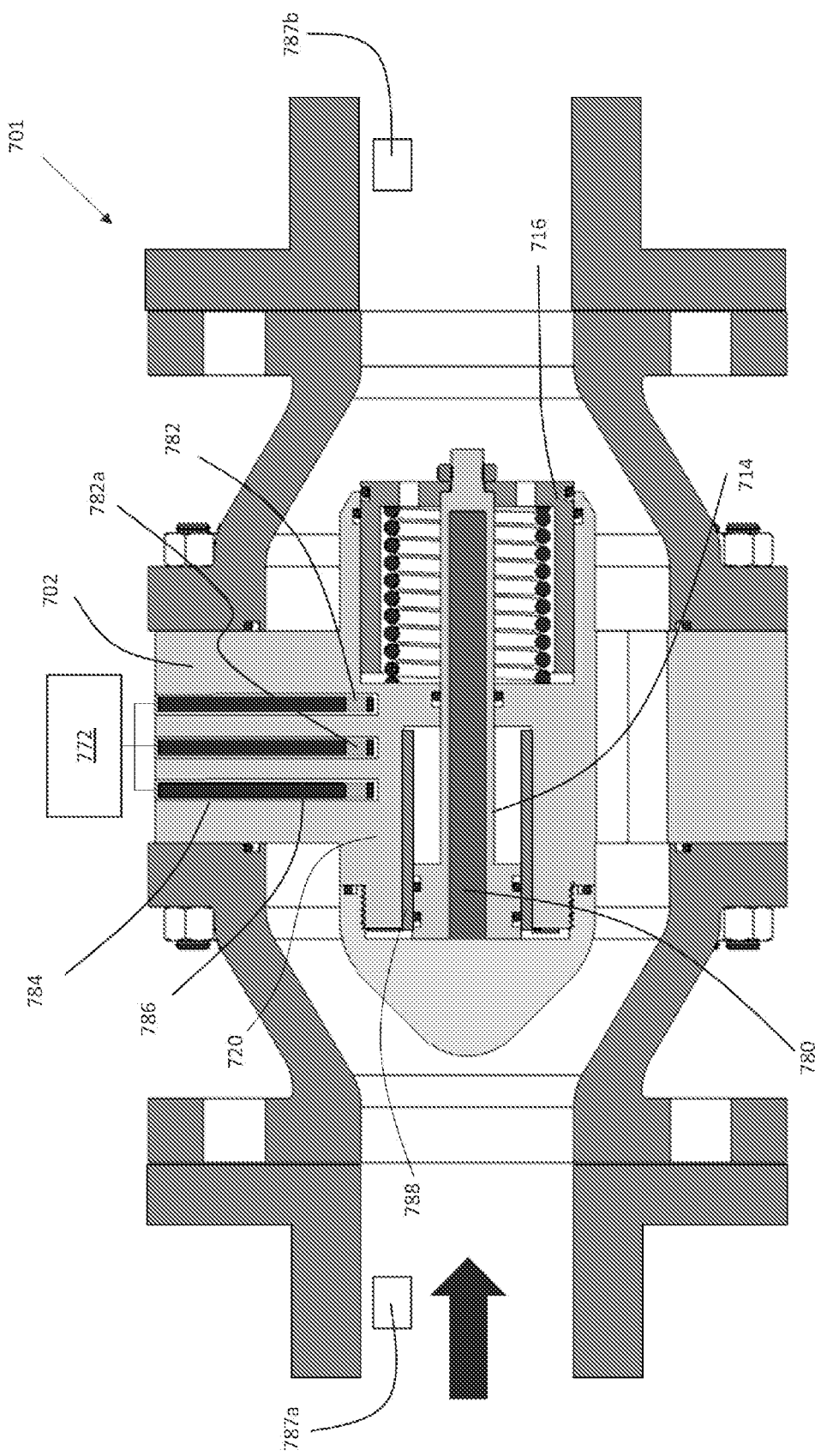
FIG. 8 shows a cross-sectional view of a device in accordance with an embodiment of the invention wherein the wherein the device includes a position sensor comprising a magnet and three magnetic field sensors mounted within three separate radial holes in the valve core.

FIG. 8 shows a cross-sectional view a fluid flow device 701 in accordance with an embodiment of the present invention, in which the device 701 comprises position sensing apparatus. The device 701 is essentially the same as the device 501 discussed above. However, the valve core 702 comprises an additional two radial holes 784 which extend into the valve core 702 from the exterior surface of the valve core 702. The radial holes 784 are spaced axially within the valve core 702. The device 701 further comprises an upstream pressure sensor 787a, arranged to determine an upstream pressure of fluid in the conduit upstream of the device 701, and a downstream pressure sensor 787b, arranged to determine a downstream pressure of fluid in the conduit downstream of the device 701.

A PCB 786 comprising a Hall effect sensor 782, electrically connected to the position sensor control unit 772, is located within each radial hole 784. The Hall effect sensor 782 may be a multiple-axis magnetic field sensor 782a. The magnet 780 is positioned with the piston 714 such that, at all axial positions of the piston 714, the sensors 782 are positioned within the end limits of the magnet 780.

In the same way as the above embodiments, the sensors 782 continuously measure the strength of the magnetic field of the magnet 780 as it moves with the piston 714 and closure member 716. The measurements may be processed by the position sensor control unit 772 using an error minimisation algorithm in order to determine the axial position of the piston 714 and closure member 716. For example, the measurements may be used to determine a deviation in the magnetisation of the magnet from a nominal magnetisation, and the determined axial position may be adjusted accordingly.

The fluid flow device 701 further comprises a cylindrical piston liner 788 arranged between the housing 720 and the piston 714.

It can be seen from the above that in at least preferred embodiments of the invention, the device is a split piece design that includes three main parts: the upstream and downstream casings, and the valve core. The valve member of the device is actuated (e.g. hydraulically or pneumatically) by a control fluid. These features help to provide a fluid flow control device which is easy to manufacture and assemble, and is less likely to cause leakage of the fluid flowing through failure of the device in the manner of conventional designs.

It will be appreciated by those skilled in the art that many variations and modifications to the embodiments described above may be made within the scope of the various aspects and embodiments of the invention set out herein. For example, even in the "fail open", "fail closed" or "fail in position" embodiments, the device may not necessarily include a spring acting on the valve member.

The invention claimed is:

1. A device for controlling the flow of a fluid through a conduit from an upstream side of the device to a downstream side of the device, the device comprising:
    an upstream valve casing defining an inlet on the upstream side of the device;
    a downstream valve casing defining an outlet aperture on the downstream side of the device;
    a valve core secured between the upstream valve casing and the downstream valve casing, wherein the upstream valve casing, the downstream valve casing, and the valve core are formed as discrete parts;
    wherein the valve core comprises a housing defining a control volume;
    a valve member movably mounted on the housing and positioned on the upstream side of the outlet aperture, wherein the valve member is arranged to move reciprocally to selectively open and close the outlet aperture, thereby controlling flow of the fluid through the outlet aperture;
    an input line defined in the valve core for introducing a fluid pressure into the control volume, wherein the valve member is acted on by the fluid pressure in the control volume to control a position of the valve member; and
    a magnet mounted on the central axis of the valve member and configured to be displaced by movement of the valve member, with displacement of the magnet being in in the same direction as the movement of valve member; and
    a position sensor arranged to determine the position of the valve member, wherein the position sensor comprises one or more multiple-axis magnetic field sensors;
    wherein the valve core comprises one or more cavities, extending from an exterior surface of the valve core, in which the one or more multiple-axis magnetic field sensors are located.

2. The device as claimed in claim 1, wherein the inlet, the valve member, and the outlet aperture are arranged coaxially with respect to each other about an axis that extends in a direction collinearly with an average direction of fluid flow through the outlet aperture.

3. The device as claimed in claim 1, wherein the valve member comprises a piston head that is arranged to move within the control volume, wherein the fluid pressure in the control volume is arranged to act on the piston head.

4. The device as claimed in claim 1, wherein the valve member comprises a closure member arranged to engage with the downstream valve casing or a detachable rim of the downstream valve casing to close the outlet aperture.

5. The device as claimed in claim 4, wherein the closure member comprises an end face at a distal end of the closure member, wherein the end face of the closure member comprises one or more apertures formed therein to allow fluid in the conduit to pass therethrough.

6. The device as claimed in claim 1, wherein the device comprises a fluid pressure control system for supplying a fluid through the input line into the control volume to provide the fluid pressure in the control volume to act on the valve member.

7. The device as claimed in claim 6, wherein the fluid pressure control system is arranged to control the fluid pressure in the control volume to control the position of the valve member.

8. The device as claimed in claim 1, wherein the device comprises (i) an upstream pressure sensor arranged to determine an upstream pressure of fluid in the conduit upstream of the device and/or (ii) a downstream pressure sensor arranged to determine a downstream pressure of fluid in the conduit downstream of the device.

9. The device as claimed in claim 8, wherein the device comprises a fluid pressure control system for supplying a fluid through the input line into the control volume to provide the fluid pressure in the control volume to act on the valve member, wherein the upstream pressure sensor and/or the downstream pressure sensor are connected to the fluid pressure control system, wherein the fluid pressure control system is arranged to use the upstream and/or downstream pressure of the fluid in the conduit to control the fluid pressure in the control volume.

10. The device as claimed in claim 6, wherein the position sensor is connected to the fluid pressure control system, wherein the fluid pressure control system is arranged to use the position of the valve member to control the fluid pressure in the control volume.

11. The device as claimed in claim 1, wherein the one or more multiple axis magnetic field sensors comprises a plurality of multiple-axis magnetic field sensors that are radially and/or axially spaced from each other.

12. The device as claimed in claim 1, wherein the position sensor is arranged to calculate a magnetic field angle from an output received from the one or more multiple axis magnetic field sensors.

13. The device as claimed in claim 1, wherein the device comprises a spring arranged to act on the valve member, wherein the spring is arranged to act on the valve member in a direction that opposes a direction in which the fluid pressure in the control volume acts on the valve member.

14. The device as claimed in claim 1, wherein the control volume is arranged such that the fluid pressure acts to bias the valve member in an upstream direction, wherein the device is arranged such that a downstream pressure of the fluid in the conduit acts to bias the valve member in a downstream direction.

15. The device as claimed in claim 14, wherein the housing comprises a channel from a downstream side of the housing that is fluidly connected to an upstream face of the valve member.

16. The device as claimed in claim 1, wherein the control volume is arranged such that the fluid pressure acts to bias the valve member in a downstream direction, wherein the device is arranged such that a downstream pressure of the fluid in the conduit acts to bias the valve member in an upstream direction.

17. The device as claimed in claim 16, wherein the housing comprises a channel from a downstream side of the housing that is fluidly connected to a downstream face of the valve member.

18. The device as claimed in claim 1, wherein the device comprises two control volumes, and two input lines defined in the valve core for introducing fluid pressures into the two control volumes respectively, wherein the valve member is acted on by a difference in the fluid pressures in the two control volumes to control the position of the valve member.

19. The device as claimed in claim 1, wherein the device comprises a cage that extends across a flow path between the housing and the outlet aperture, wherein the cage comprises a plurality of apertures to allow fluid to flow through the cage.

* * * * *